Figure 1:
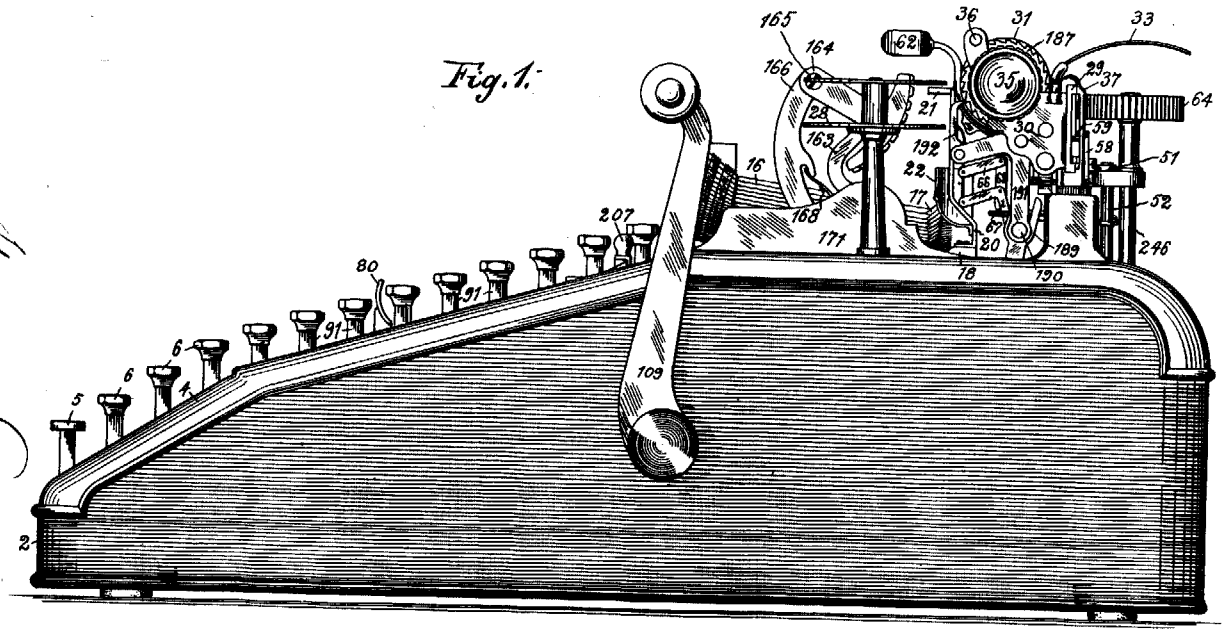

No. 12,528.

REISSUED AUG. 28, 1906.

H. ELLIS.

TYPE WRITING, CALCULATING, AND CALCULATOR RECORDING MACHINE.

APPLICATION FILED NOV. 3, 1904.

12 SHEETS—SHEET 1.

Witnesses:

John A. Paulson, by William H. Reid.

Malcolm Ellis, Inventor

Schreiter & Mathews.

his Att'ys

No. 12,528.

REISSUED AUG. 28, 1906.

H. ELLIS.

TYPE WRITING, CALCULATING, AND CALCULATOR RECORDING MACHINE.

APPLICATION FILED NOV. 3, 1904.

12 SHEETS—SHEET 2.

Witnesses:

John A. Paulson, by William H. Reid.

Malcolm Ellis, Inventor

Schreiter & Mathews, his Att'ys

No. 12,528.

REISSUED AUG. 28, 1906.

H. ELLIS.

TYPE WRITING, CALCULATING, AND CALCULATOR RECORDING MACHINE.

APPLICATION FILED NOV. 3, 1904.

12 SHEETS—SHEET 3.

Witnesses:

John A. Paulson, by William H. Reid.

Malcolm Ellis, Inventor

Schreiter & Mathews, his Att'ys

No. 12,528. REISSUED AUG. 28, 1906.

H. ELLIS.

TYPE WRITING, CALCULATING, AND CALCULATOR RECORDING MACHINE.

APPLICATION FILED NOV. 3, 1904.

12 SHEETS—SHEET 4.

Witnesses:

John A. Paulsen, by William H. Reid.

Haloolm Ellis Inventor

Schreiter & Mathews. his Att'ys

No. 12,528. REISSUED AUG. 28, 1906.

H. ELLIS.

TYPE WRITING, CALCULATING, AND CALCULATOR RECORDING MACHINE.

APPLICATION FILED NOV. 3, 1904.

12 SHEETS—SHEET 5.

Witnesses:

John A. Paulson, by William H. Reid.

Malcolm Ellis, Inventor

Schreiter & Mathews, his Att'ys

No. 12,528. REISSUED AUG. 28, 1906.

H. ELLIS.

TYPE WRITING, CALCULATING, AND CALCULATOR RECORDING MACHINE.

APPLICATION FILED NOV. 3, 1904.

12 SHEETS—SHEET 6.

Witnesses:

John A. Paulson,

William H. Reid.

Malcolm Ellis, Inventor by Schreiter & Mathews his Att'ys

No. 12,528. REISSUED AUG. 28, 1906.
H. ELLIS.
TYPE WRITING, CALCULATING, AND CALCULATOR RECORDING MACHINE.
APPLICATION FILED NOV. 3, 1904.
12 SHEETS—SHEET 7.
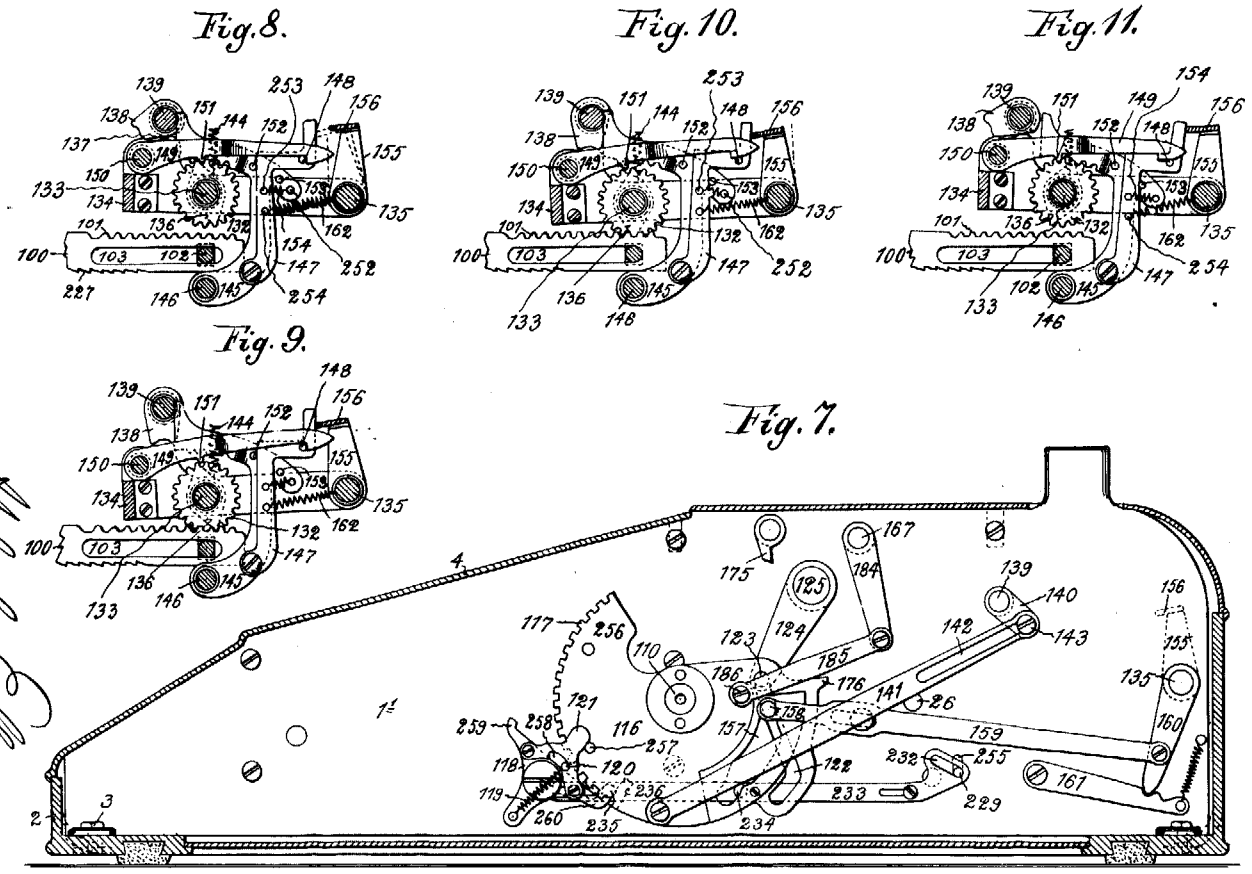
Witnesses:
John A. Paulson,
William H. Reid.
Malcolm Ellis, Inventor
by Schreiter & Mathews,
his Att'ys No. 12,528. REISSUED AUG. 28, 1906.
H. ELLIS.
TYPE WRITING, CALCULATING, AND CALCULATOR RECORDING MACHINE.
APPLICATION FILED NOV. 3, 1904.
12 SHEETS—SHEET 8.
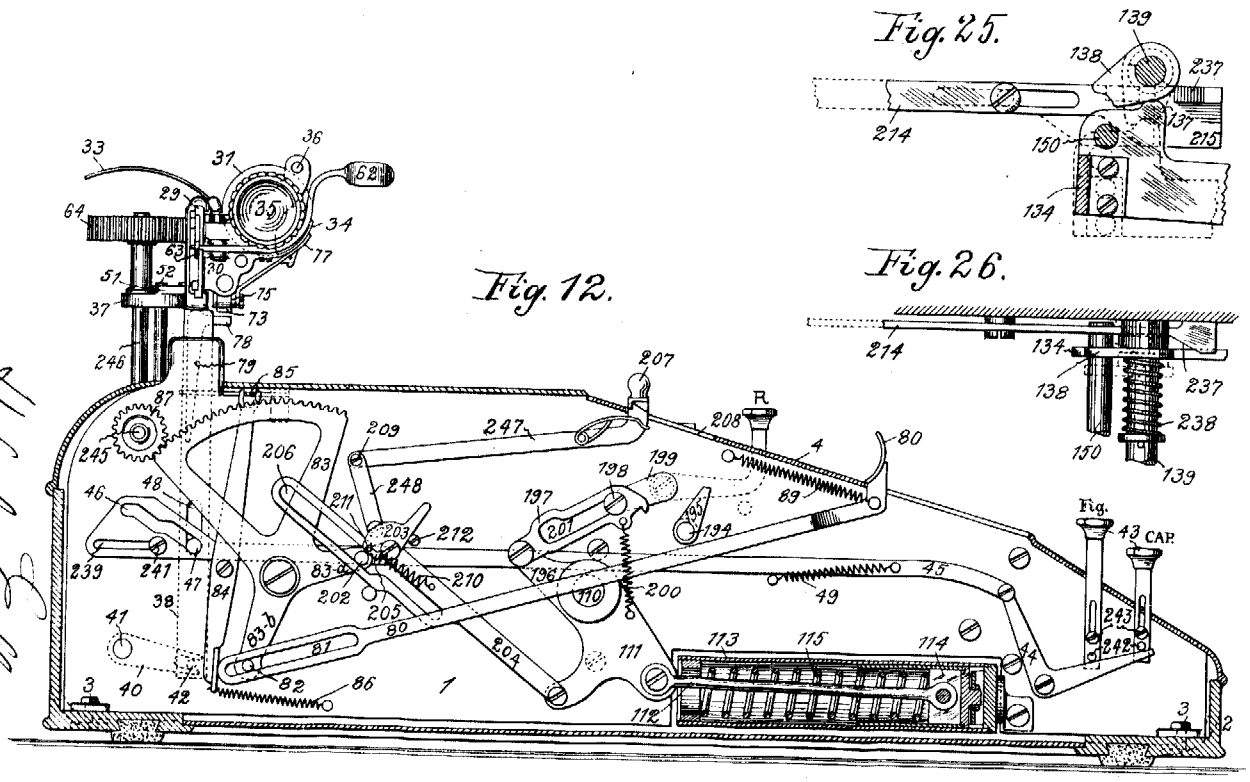
Witnesses:
John A. Paulsen, by William H. Reid.
Malcolm Ellis, Inventor
Schreiter & Mathews, his Att'ys No. 12,528.
REISSUED AUG. 28, 1906.
H. ELLIS.
TYPE WRITING, CALCULATING, AND CALCULATOR RECORDING MACHINE.
APPLICATION FILED NOV. 3, 1904.
12 SHEETS—SHEET 9.
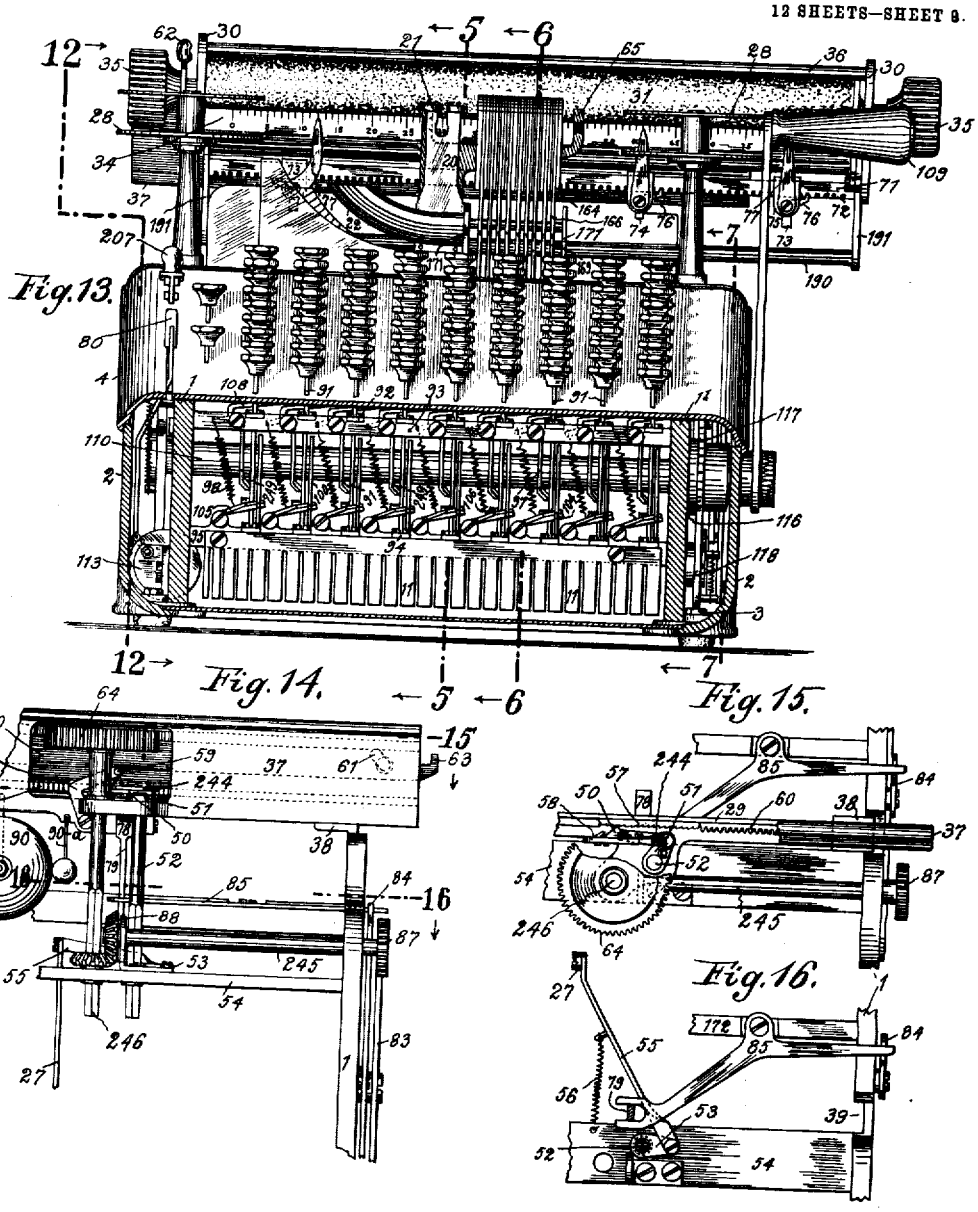
Witnesses:
John A. Paulson, by William A. Reid.
Malcolm Ellis, Inventor,
Schreiter & Mathews.
his Att'ys.

No. 12,528.

REISSUED AUG. 28, 1906.

H. ELLIS.

TYPE WRITING, CALCULATING, AND CALCULATOR RECORDING MACHINE.

APPLICATION FILED NOV. 3, 1904.

12 SHEETS—SHEET 10.

Witnesses:

John A. Paulen, by
William H. Reid.

Haloolm Ellis, Inventor

Schreiter & Mathews,
his Att'ys

No. 12,528. REISSUED AUG. 28, 1906.

H. ELLIS.

TYPE WRITING, CALCULATING, AND CALCULATOR RECORDING MACHINE.

APPLICATION FILED NOV. 3, 1904.

12 SHEETS—SHEET 11.

Witnesses:

John A. Paulsen by William H. Reid.

Malcolm Ellis, Inventor

Schreiter & Mathews, his Att'ys

No. 12,528. REISSUED AUG. 28, 1906.

H. ELLIS.

TYPE WRITING, CALCULATING, AND CALCULATOR RECORDING MACHINE.

APPLICATION FILED NOV. 3, 1904.

12 SHEETS—SHEET 12.

Witnesses:

John A. Paulson,

William H. Reid by

Malcolm Ellis, Inventor

Schreiter & Mathews, his Att'ys

UNITED STATES PATENT OFFICE.

HALCOLM ELLIS, OF NEW YORK, N. Y.

TYPE-WRITING, CALCULATING, AND CALCULATOR-RECORDING MACHINE.

No. 12,528. Specification of Reissued Letters Patent. Reissued Aug. 28, 1906.

Original No. 744,004, dated November 10, 1903. Application for reissue filed November 3, 1904. Serial No. 231,309.

*To all whom it may concern:*

Be it known that I, HALCOLM ELLIS, a citizen of the United States, residing in the city, county, and State of New York, have invented certain new and useful Improvements in Type-Writing, Calculating, and Calculator-Recording Machines, of which the following is a full, clear, and exact specification.

My invention relates to type-writing, calculating, and calculator-recording machines. Its object is to provide a machine whereon plain or tabulated type-writing, plain or tabulated figure-writing, and also calculating and calculator-recording work or only some or either of these functions independently of all others may be performed in any desired order; and the invention consists of a machine of the "Arithmograph" type, wherein type-writing, figure-writing, calculating, and calculator-recording devices are so constructed and combined with each other and with mechanisms for engaging and disengaging their operating parts with the actuating mechanisms of the machine that the several functions of the machine may be performed separately or cojointly and that all of these functions or only some of them may be performed at a time and in such successive order as the nature of the work to be performed on the machine requires.

A suitable form of a machine embodying all features of my invention is illustrated in the accompanying drawings, wherein—

Figure 2:
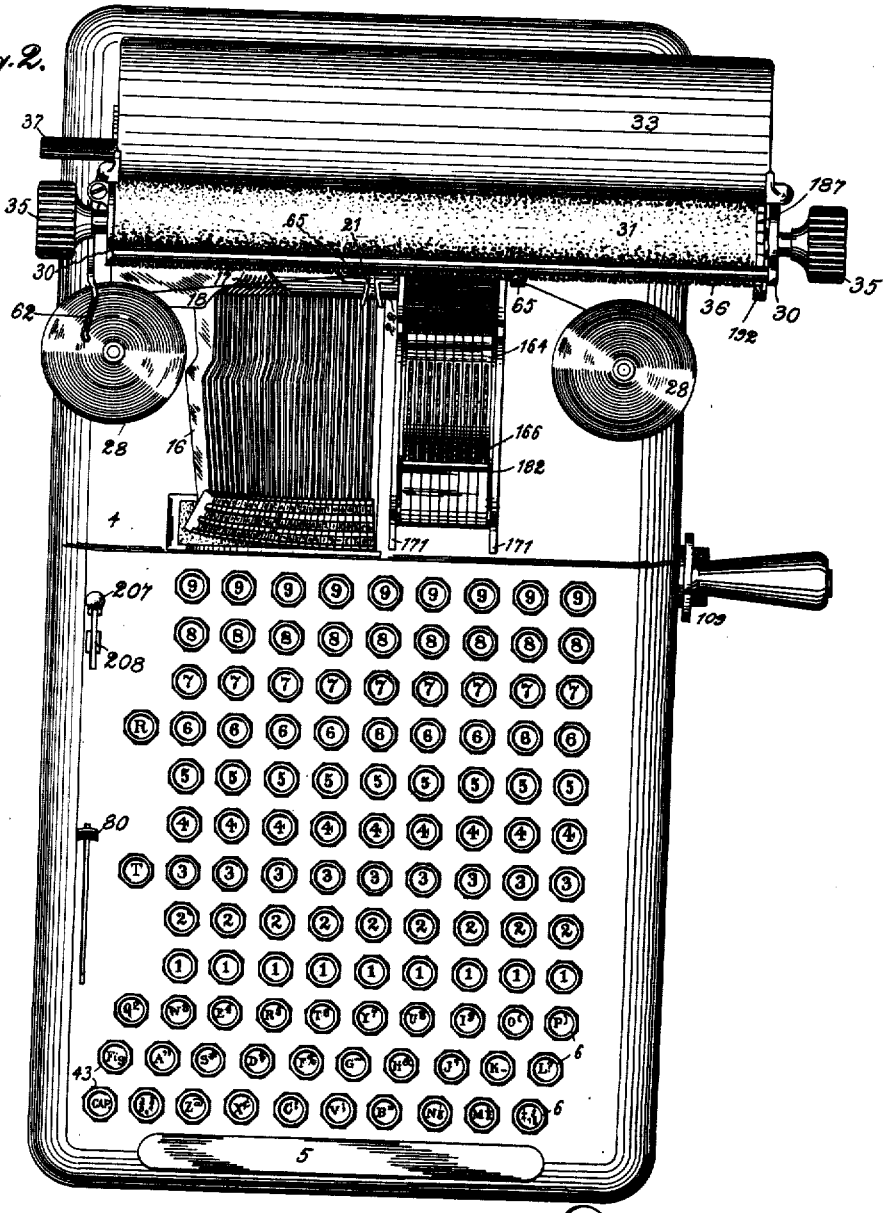
Figure 3:
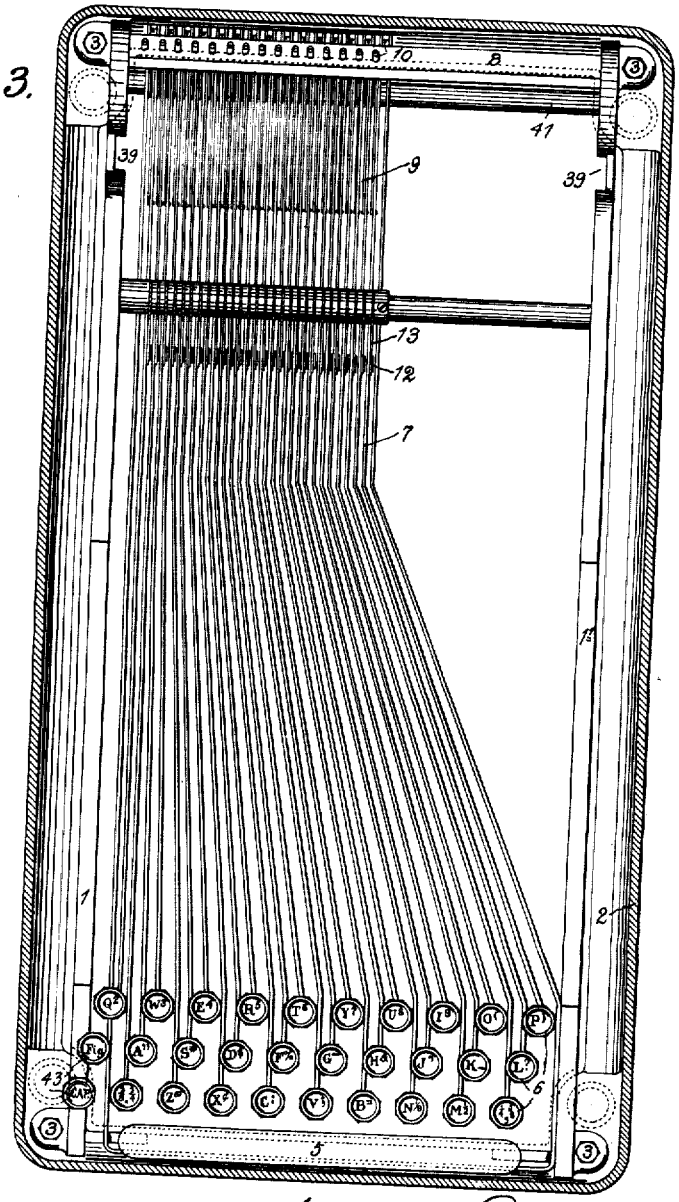
Figure 4:
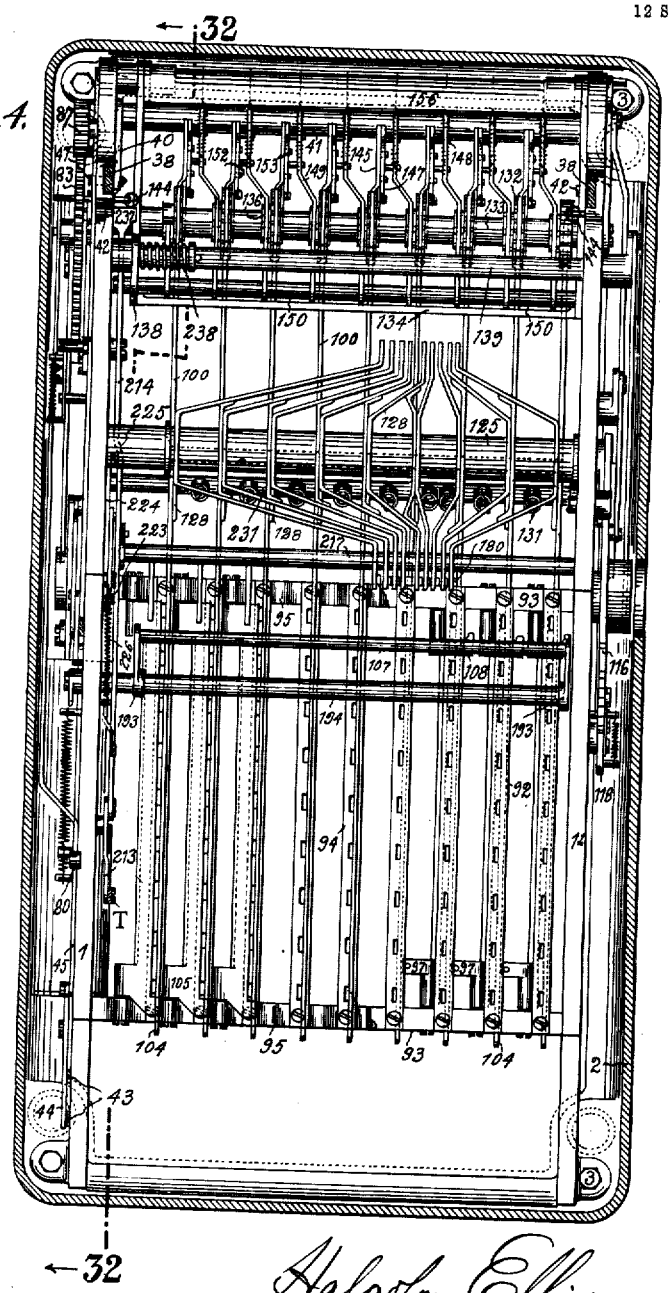
Figure 5:
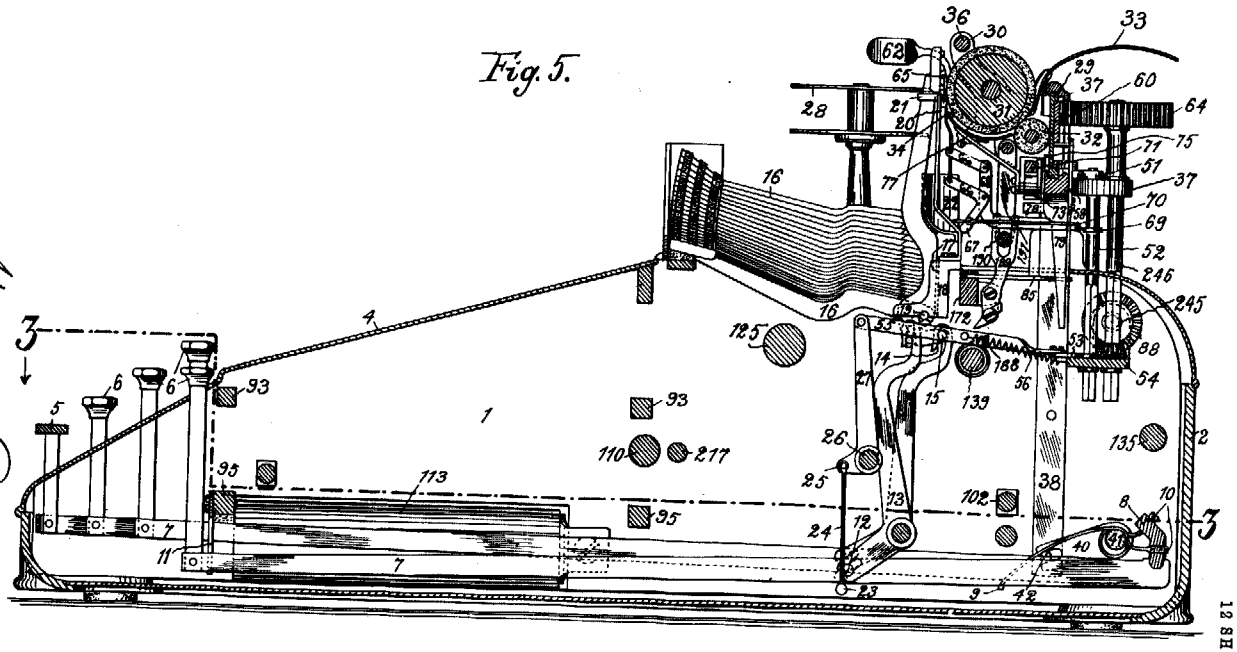
Figure 6:
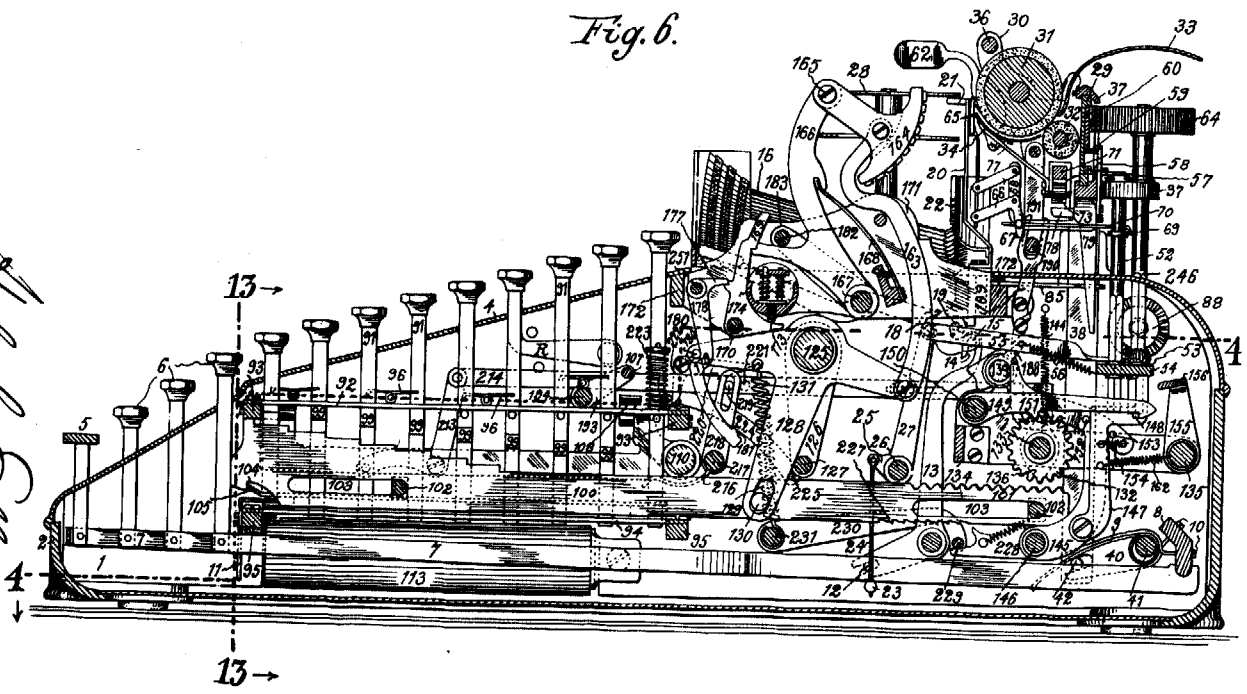
Figure 17:
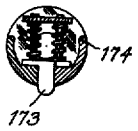
Figure 18:
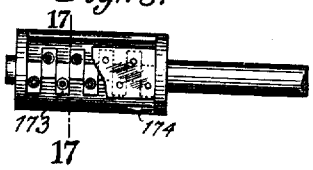
Figure 19:
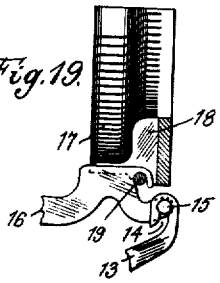
Figure 20:
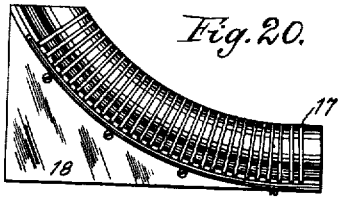
Figure 21:
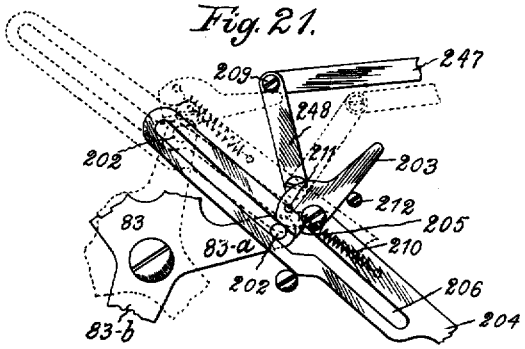
Figure 22:
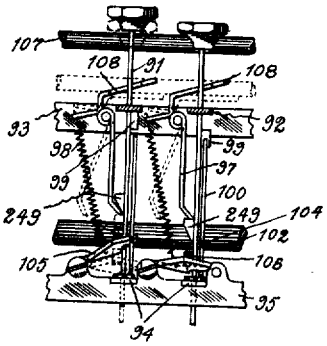
Figure 23:
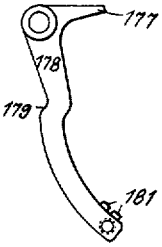
Figure 24:
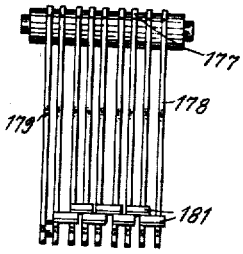
Figure 27:
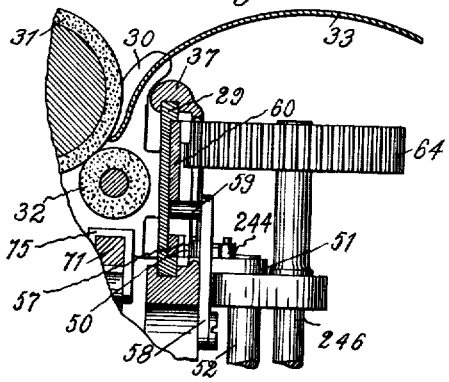
Figure 28:
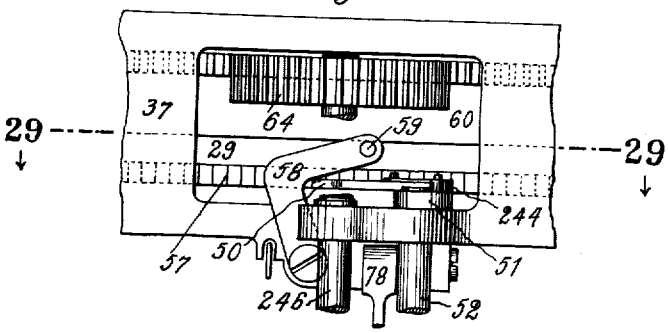
Figure 29:
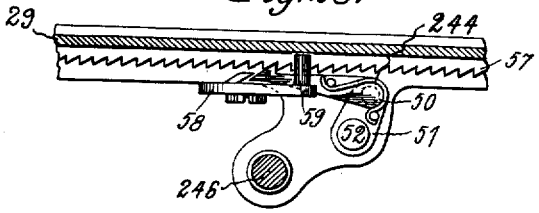
Figure 31:
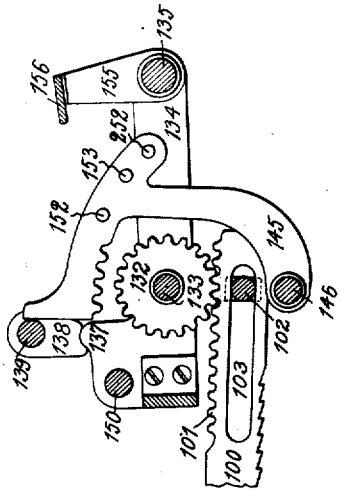
Figure 30:
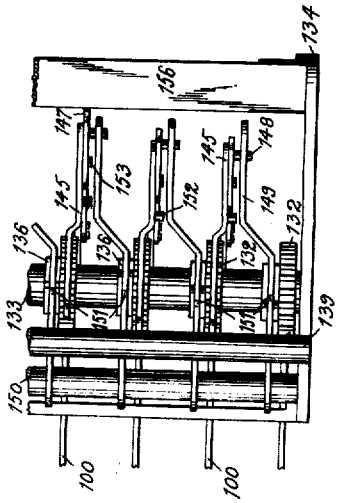
Figure 32:
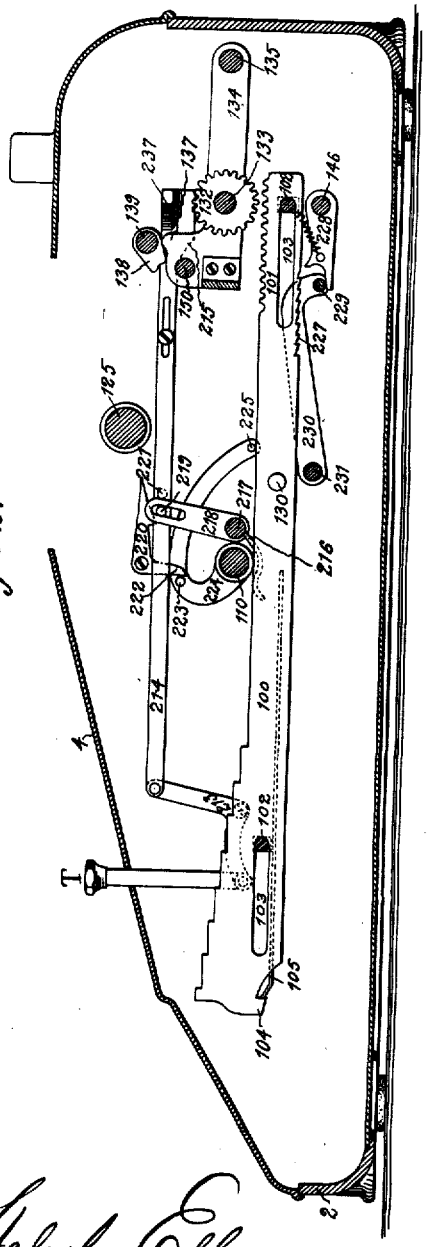

Figure 1 is an elevation of the right-hand side of the machine. Fig. 2 is a plan or top view of the machine. Fig. 3 is a horizontal section on line 3 3 indicated in Fig. 5. Fig. 4 is a horizontal section on line 4 4 indicated in Fig. 6. Fig. 5 is a vertical section on line 5 5 indicated in Fig. 13, showing only parts operated by the type-writer keys. Fig. 6 is a vertical section on line 6 6 indicated in Fig. 13, showing particularly parts operated by the number-keys. Fig. 7 is a vertical section on the line 7 7 indicated in Fig. 13, showing only the operative parts on the outside of the right-hand frame. Figs. 8, 9, 10, 11 are detail views of the carrying device in different positions. Fig. 12 is a vertical section on line 12 12 indicated in Fig. 13, showing the operating parts on the outside of the left-hand frame. Fig. 13 is a vertical section on line 13 13 indicated in Fig. 6, showing in part the front elevation of the machine. Fig. 14 is a detail view of part of the rear elevation of the carriage. Fig. 15 is a detail horizontal section on line 15 15 indicated in Fig. 14. Fig. 16 is a detail view, a horizontal section on line 16 16, indicated in Fig. 14. Fig. 17 is a sectional view on line 17 17 indicated in Fig. 18, and Fig. 18 a plan view, of the releasing-plungers for the calculating type-sectors and of the cylindrical box wherein they are located. Fig. 19 is a detail sectional view, and Fig. 20 a front elevation, of the segmental journal-block for the type-writer arms. Fig. 21 is a detail view showing the handle connection with the carriage-operating device. Fig. 22 is a detail front view of two stems of the number-keys and of parts operatively connected therewith in different positions. Fig. 23 is a side view, and Fig. 24 a front view, of the locking device for the type-sectors of the number-printing mechanism. Fig. 25 is a side view, and Fig. 26 a plan view, of a part of the calculating mechanism detail. Fig. 27 is an enlarged sectional view of the carriage. Fig. 28 is an enlarged fragmentary view thereof, showing the mechanism for moving the carriage. Fig. 29 is a fractional view on line 29 29 in Fig. 28 of a part of the carriage-feeding device. Fig. 30 is a plan view, and Fig. 31 a side view, of the carrying device, some parts in Fig. 31 being omitted and others shown in different position from Fig. 30. Fig. 32 is a vertical section on the line 32 32, indicated in Fig. 4, showing the total-key T operating mechanism.

The machine consists of a stationary frame set in a box or casing, the type-writing, figure-printing, calculating and recording mechanisms, and their operating parts arranged therein, a movable carriage-frame, a carriage movably mounted in the carriage-frame, mechanism for shifting the carriage-frame, mechanisms for moving the carriage in the frame, mechanisms for engaging the operating parts and actuating them for performing their functions in such successive order as required for the work to be done on the machine, and of other auxiliary devices that are not essential for the main purposes of the machine, but render its operation more convenient and add to the scope of its utility.

*The stationary frame.*—The stationary frame consists of two parallel side plates 1 and 1′, affixed to the base of the box or casing by screws 3 and held together by cross-bars supporting the several mechanisms and referred to specifically in the descriptions of these mechanisms. The casing consists of a base 2, made up of a rectangular bottom plate provided with suitable supports, preferably of rubber, set in sockets of the bottom plate, for setting the machine upon a table. Base 2 is flanged on all four sides, the flanges standing substantially at right angles to the bottom plate, and a cover 4 is permanently secured thereon. This cover has a slant toward the front part of the machine, like the cover of an ordinary type-writer, and is provided with apertures through which the keys, knobs, &c., for operating the several mechanisms of the machine project. Its object is to protect the mechanisms against injury and clogging by dust. Incidentally in this particular form of the machine the perforations in the cover serve also as bearings for the stems of the type-writing keys, which are pivotally connected with the levers, and for this reason no other bearings or guides for these keys are provided. This function of the cover is, however, not essential. By making rigid the connection of the keys with the levers they operate or by making the stems of the keys integral with their levers the use of the perforations in the cover as bearings or guides for the key-stems would be obviated. Either arrangement meets the requirements of such machine and both are commonly used in ordinary type-writing machines.

*The movable frame.*—The vertically-movable frame supports the horizontally-movable carriage proper and serves also as guide or bearing for its horizontal movements transversely to the longitudinal axis of the stationary frame. For this reason and because the vertical movements of the frame are part of the functions of the carriage the movable frame is described as a part of the carriage and the mechanism for operating it is described as the mechanism for vertically moving the carriage.

*The carriage.*—The main objects of the movable carriage are to support the platen and the mechanism for feeding the paper—that is to say, to advance it intermittently and successively as the type-writing, figure-printing, and calculator-recording progresses and to bring it and hold it in the positions required for the several operations in whatever order or combination they are performed.

The vertically-movable carriage-frame is made up of the horizontal guide-bar 37, secured on each end to one of the vertical posts 38, movably fitted in grooves 39, provided in the side plates 1 and 1′. (See Figs. 1, 2, 3, and 6.) The "up-and-down" or vertical moving of the carriage is required to bring the platen 31 on level with one of the three sets of types, small and capital letters and figures and marks, engraved on the type-bar 16, one underneath the other.

The moving or shifting of the frame is produced by the mechanism shown in detail in Fig. 12 and actuated by shift-keys 43, marked "Cap." and "Fig." in Fig. 3. On the outer side of the left-side frame-plate 1, near the front end thereof, a bell-crank 44 is fulcrumed thereto, and its upper arm is pivotally connected to a horizontal bar 45, extending to the rear of the machine, where it is supported and its motion is guided and limited by screw-pin 241, passed through slot 239 and screwed in plate 1. The other arm of bell-crank 44 is engaged by pins 242, one of these pins being set in the stems of each of the two "shift-keys," (marked 43 in Fig. 12 and "Fig." and "Cap.," respectively, in Fig. 3.) By depressing either of these keys the bar 45 is moved forward toward the front end of the machine. Screws 243, one set in each of the slots of the two keys and screwed in the side plate 1, serve to guide the keys and also to limit their movement. In the post 38, next adjacent to the left side plate 1, is secured pin 47, projecting through slot 48 in plate 1, shaped to permit its vertical movement. Pin 47 engages in the terrace-like-shaped slot 46 in bar 45, consisting of two inclined and of two horizontal portions. The slot is so designed that when bar 45 is drawn forward by depressing the key-actuated arm of bell-crank 44 the pin 47 is moved upward, (sliding through the first incline of slot 46,) then held stationary, (while sliding through the first horizontal portion of the slot,) and then moved farther upward, (while sliding through the second incline,) and finally held stationary in the last horizontal portion of the slot. Pin 47 being rigidly set in post 38, this movement of the pin raises the carriage-frame supported on posts 38. To equalize the motion of both posts 38, a pair of cranks 40 (shown in dotted lines in Fig. 12 and in full lines in Fig. 5) are secured to the ends of crank-shaft 41. They engage with their slotted ends pins 42, secured one in each post 38, and thus both posts are moved simultaneously by the action of bar 45, as explained above.

The key marked "Cap." in Fig. 3 when depressed acts upon bell-crank 44 to move bar 45 to such an extent only that pin 47 is raised over the first inclined portion of slot 46. The action of the second key (marked "Fig." in Fig. 3) when depressed moves the bell-crank 44 to draw bar 45 its entire travel forward, the pin 47 passing through both portions of the slot 46 and into the last horizontal portion thereof. Thereby the carriage is raised the full distance of its vertical motion. When the pressure upon shift-keys is released, spring 49 draws the bar 45 back again, and the carriage and the connected parts of the "shift-operating" mechanism are returned to their normal positions. By these means the platen 31 is brought to any one of its requisite positions to enable to print on the same line any one of the three type engraved at three different levels on each type-bar.

The horizontally-movable part of the carriage is mounted in the vertically-movable frame by means of the sliding plate 29, movably fitted upon the guide-bar 37. At each end of plate 29 is secured a bracket 30, and on these brackets are mounted the platen 31, friction-roller 32, guide 33, scale 34, and guide-rod 36. The platen is provided with knobs 35, one on each end, for rotating it by hand when the paper is inserted or removed or shifted, as is at times desired when the machine is used, and with mechanisms for rotating it step by step to feed the paper forward as the work progresses. This mechanism is described farther on under the heading "Paper-feed." The horizontally-movable part of the carriage is normally located at the right-hand side of the machine. It is moved to the left-hand side of the machine by a step-by-step movement by mechanism actuated by the universal bar 23 and constructed as follows.

On each end of shaft 26, set in the machine a short distance above the universal bar, is secured a short crank 25, the ends of which are connected with the ends of the universal bar by rods 24. A crank 27 is secured to an intermediate part of shaft 26 and is connected by rod 55 with a crank 53, secured on the lower end of a vertical shaft 52, as shown in Figs. 5 and 16. A spring 56 between rod 55 and bar 54 serves to return the parts to their normal position and keep the universal bar in its raised position. This shaft is supported in cross-bar 54 and carries at its upper end crank 51. To this crank is pivoted hook 50, that engages rack 57 on the back of plate 29. (See Figs. 14, 15, 27, 28, and 29.) Spring 244, secured between the crank 51 and the hook 50, serves to retain the hook in engagement with this rack. The universal bar 23 extends across the machine underneath the levers that are operated by the type-writer keys and the spacing-bar 5. By depressing any of the type-writer keys or the spacing-bar 5 this universal bar 23 is depressed, and hook 50 is moved to engage with rack 57 one tooth to the right, and when the universal bar is again released hook 50 draws rack 57 (and plate 29) the distance of one tooth to the left.

To prevent the hook 50 from engaging other than the next tooth in the rack 57, a bent lever 58 is interposed between the point of the hook 50 and rack 57. (See Figs. 14, 15, 27, 28, and 29.) Lever 58 controls the motion of hook 50 and if moved to the right (see Figs. 14 and 15) disengages hook 50 from rack 57. This must be done whenever the carriage is returned to the right-hand side of the machine in order to commence a new line of writing. In the upper end of the bent lever 58 pin 59 is set, extending under the rack-bar 60, mounted on the rear side of plate 29. Screws engaging in diagonal slots 61 (visible in Fig. 14) of the rack-bar 60 cause it to rise and fall as it is moved laterally in relation to the plate 29, and a movement of rack-bar 60 to the right (see Fig. 14) causes it to depress pin 59, whereupon bent lever 58 moves to the right and raises hook 50 out of engagement with the rack 57. This permits the carriage to be moved uninterruptedly to the right.

Two separate devices are provided for acting upon rack-bar 60, depressing it to its lowered position. One is a handle 62, (see Figs. 12 and 14,) which engages hook 63 at the end of the rack-bar 60 when pushed to the right. The rack-bar 60 is then first depressed and disengaged from hook 50, and the handle moves the carriage to the right. The other device is the spur-gear 64, that is actuated by the tabulating-lever 80 and handle 109. When by the action of either the tabulating-lever 80 or handle 109 the gear 64 is rotated to move the carriage to the right, the rack-bar 60 is first depressed and the hook 50 released from rack 57, as hereinbefore explained.

The mechanism for actuating gear 64 to shift the carriage from its normal position at the right-hand end of the machine to a position predetermined by setting the device designated here as the "tabulating-stop" is constructed as follows: The teeth of segmental rack 83, pivoted to the side plate 1, engage gear 87, secured to the end of horizontal shaft 245. (See Figs. 12 and 14.) On the other end of shaft 245 a mitered gear 88 is secured thereto, meshing with a similar gear set on the lower end of vertical shaft 246. On the other end of this shaft gear 64 is secured, engaging the rack-bar 60 on the carriage, as explained above. Pin 202, secured in the short arm 83ª of segmental rack 83, (shown in Figs. 12 and 21,) engages in the recessed slot 206 of bar 204, which is pivoted to crank 111, secured to the main operating-shaft 110. Hook 203, pivoted to the same bar 204, is held by spring 210 in position to engage pin 202 when the latter is within the lower part of slot 206— that is, anywhere below the recessed portion or offset 205 of the slot. Pin 202 is in this position ready to be engaged by hook 203 (shown by the dotted lines in Fig. 21) when the carriage has moved to extreme left-hand end of its travel. Then wheel 87 will have made one complete revolution and be in engagement with the teeth of segmental rack 83 at the right-hand terminal, or, in other words, at the other end of the rack 83 from that shown in Fig. 12.

On the other end of shaft 110 (the main driving-shaft of the machine) handle 109 is rigidly secured thereto, the shaft 110 and all mechanism connected therewith being operated by that handle. When the handle 109 is drawn forward, (toward the front end of the machine,) the bar 204 is moved upward and toward the rear end of the machine (toward left in Fig. 12) and hook 203 engages pin 202. By the return stroke of handle 109 bar 204 is drawn downward and toward the forward end of the machine, (toward right in Fig. 12,) and hook 203, engaging with pin 202, draws it to the position shown in Fig. 12 and in solid lines in Fig. 21. Hook 203 has a limited turning motion on its pivot, and the travel of the slotted bar 204 being slightly longer than the possible travel of the pin 202 the hook is turned on its pivot when the pin 202 reaches the offset 205, and this arrangement permits the pin to slide off of the hook at that point, moving along the offset 205 in the slot 206. That terminates the turning motion of segmental rack 83 and also the motion of the carriage toward the right, the pin 202 traveling free in the remaining part of slot 206 as far as the operation of the machine requires. This device is used in the work designated as "invoicing," that is explained farther on.

When it is not desired to use this invoicing device, a small knob 207, (see Figs. 2 and 12,) which slides in a longitudinal slot 208 in cover 4, is moved to its upper position, as shown in Fig. 12. This setting of knob 207 moves pin 209, set in the pivoted joint of links 247 and 248, into the path of the tail end of hook 203. Then when the bar 204 is moved upwardly and to the left, (see Fig. 12,) the tail of hook 203 strikes against this pin 209, and thereby hook 203 is turned into the position indicated in dotted lines in Fig. 21. In this position (shown in the dotted lines of Fig. 21) hook 203 cannot engage pin 202, and consequently the bar 204 can be moved back and forth without acting on the rack 83. Hook 203 is held in this position by the same spring 210, secured to the bar 204 and to a small pin 211, set in the point of hook 203, because by turning it, as explained, in either of the two positions shown in Fig. 21, one in full and the other in dotted lines, hook 203 is swung either above or below the dead-center of its turning motion.

Pin 212, set in the side plate 1 in the path of the tail of hook 203, serves to turn it back to its normal position, swinging its point in path of slot 206, when the handle 109 is returned to its normal position. When the knob 207 is drawn to its lower position, pin 209 is held outside of the path of the tail of hook 203. In this position of pin 209 (shown in dotted lines in Fig. 21) hook 203 engages pin 202, and thus causes the carriage to move as explained, when the handle 109 is operated.

*Mechanism for moving the carriage laterally for figure-printing.*—The carriage is not moved by operating the calculator-keys to set the figures to be printed. For this purpose the following mechanism (illustrated in Fig. 12) is provided: A square rod 71, (see Fig. 13,) having teeth 72, corresponding in pitch with scale 34 and with ratchet-teeth 57, cut on its lower edge, is mounted between brackets 30, and on this rod 71 are mounted the marginal stops 73 and the tabulating-stops 74, so that they may be set and shifted as the character of the work requires. The construction and operation of the marginal stops 73 and the tabulating-stops 74 are substantially alike. Each consists of a box 75, the sides of which extend below the rod 71, where they are connected by a pivot, angle-pieces 76, and pointer 77, secured on the pivot. One arm of angle-piece 76 engages teeth 72, while the other extends straight down, when the pointer is set upright, as shown in Fig. 13. In this position the pointer is held by spring-friction against the scale 34, the arm of angle-piece 76 being then in engagement with the teeth 72. When it is desired to move the stop, the pointer is turned to the right. On the under side of guide-frame 37 a bumper 78 is pivoted, having an arm 79 (see Fig. 5) extending downward. The depending arms of the angle-pieces 76 in the tabulating-stops 74 are shorter than the corresponding parts of the marginal stops 73 to enable them to pass over the top of bumper 78 when the latter is in its normal position; but when arm 79 is moved forward bumper 78 is thereby raised, and then the depending arm of angle-piece 76 of the tabulating-stop 74 engages bumper 78 and stops the carriage. The angle-pieces 76 of the marginal stops are long enough to engage the bumper when in this position. There may be as many tabulating-stops 74 as required for any particular work. They are set at the proper places on scale 34. A small bell 90 (see Fig. 14) is rung by right-hand marginal stop 73 just before the stop reaches bumper 78, which is done by a pin (not shown) set in the back of the stop 73, which raises the striker $90^a$ as it passes and rings the bell.

In the downwardly-extending arm $83^b$ of segmental rack 83 pin 82 is set, that engages in slot 81 of bar 80. The other end of this bar is bent and projected through a slot in the cover 4, terminating into a convenient handle, by which the bar 80, hereinafter designated the "tabulating-lever," is operated. By pulling the tabulating-lever 80 toward the front end of the machine segmental rack 83 is swung on its pivot, and thereby pinion 87 and gear 64 and the other mechanism are operated to move the carriage to the left in the same manner as explained above with reference to the carriage-moving mechanism actuated by handle 109. Tabulating-lever 80 acts also on the mechanism, stopping the carriage in the position required for printing a figure or a row of them. The slotted end of lever 80 projects beyond pin 82 and abuts against the lower end of lever 84, pivoted approximately midway between its ends to plate 1. The upper end of lever 84 engages lever 85, (see Figs. 14, 15, and 16,) operating bumper 78 to move it into and out of the path of the tabulating-stops 74, limiting the travel of the carriage. When lever 80 is drawn forward, spring 86 swings the lower end of lever 84 forward, and thereby lever 85 is moved to swing arm 79 forward and to raise bumper 78 into the path of the tabulating-stop 74. When this stop 74 abuts against bumper 78, the motion of the carriage is stopped. When the tabulating-lever 80 is released, spring 89 draws it to its normal position without changing the position of the carriage, pin 82 sliding through slot 81. Its end abutting against the lower end of the lever 84 causes this lever to swing back, (against the drawing action of spring 86,) and the mechanism effecting the stopping of the carriage is reversed and returned to its normal position.

*The handle and mechanism for actuating the type-setting and printing devices.*—The main shaft 110 of the machine and the disk 116, rigidly secured thereto, are repeatedly mentioned in connection with the several operating mechanisms of the machine that are actuated thereby. Shaft 110 extends transversely the entire width of the machine, and its ends project through plates 1 and 1′. On its right-hand end, projecting through the the plate 1, disk 116 is rigidly secured thereto, (see Fig. 7,) and beyond it handle 109 is detachably set thereon. On its left-hand end crank 111 is rigidly secured thereto (see Fig. 12) and connected by rod 112 to piston 114, fitted into cylinder 113. These devices, together with the coiled spring 115, constitute the motive-power mechanism of the machine. By drawing handle 109 toward the front end of the machine shaft 110 and disk 116 are rotated from right to left. Their return motion is effected by the reaction of coiled spring 115, inserted in the cylinder 113, which is compressed by the forward motion of handle 109, piston 114, connected by rod 112 to crank 111, being thereby drawn outwardly.

The forward motion of the handle 109, turning the shaft 110 from right to left, actuates the several mechanisms, as more fully explained in connection therewith, effecting the setting and printing of numbers or rows of numbers, the adding, the setting and printing of the total, the shifting of the carriage as required for these successive operations, &c., and the return motion of the handle actuates the mechanisms to effect the restoring of all parts of these mechanisms in position ready for new action. As the return motion of handle 109 is effected quite forcibly by the action of spring 115, piston 114 is snugly fitted in cylinder 113 and the cylinder closed. Thereby an air-cushion is produced between the piston 114 and the head of the cylinder 113, that modifies the force of the spring and causes a comparatively slow smooth stop of the handle and of the several mechanisms when returning to their normal positions.

The extent of the motion of handle 109, and consequently also of turning shaft 110 and the mechanism illustrated in Fig. 7, and which is necessary to prevent any excess of the motion of shaft 110, disk 116, and of the several mechanisms connected therewith, is controlled by a governor constructed as follows. This governor comprises a two-armed oscillating pawl pivoted to plate 1′ and held in position against the serrated edge 117 of disk 116 by spring 119. This is a coiled spring having one end connected to a pin set in the head of pawl 118 and the other to pin 120, set in plate 1′ and projecting through slot 258 in pawl 118. Tongue 121, affixed to the pawl 118 in line with its axis, projects beyond the periphery of disk 116 and in the path of pins 256 and 257 set therein. The operation of the governor is as follows: When the handle 109 is drawn forwardly, the pin 256, traveling from right to left with the disk 116, strikes tongue 121 and swings it (and pawl 118) from left to right. This brings pawl-arm 259 in engagement with the serrated edge 117 of disk 116, and thereby arrests all further motion of the disk and of all mechanism operated by it. On the return motion of handle 109 pin 257 strikes against tongue 121 from the opposite side and swings it from right to left. This action brings the arm 260 in engagement with the serrated edge of disk 116 and arrests its motion. This governing mechanism prevents overstraining and possible breaking of the several mechanisms actuated by these devices.

*Paper-feed.*—The paper is fed by turning the platen 31 step by step. During the type-writing operation this is effected in the manner common to all type-writing machines. For the printing of figures and totals it is necessary to rotate the roller 31 through a distance of one tooth of the ratchet-wheel 187 every time after the type-sectors 164 have made an impression on the paper. This is done by the operation of the handle 109 actuating the mechanism shown in Figs. 1 and 6 and arranged and constructed as follows. Forked lever 189 is movably mounted on a pivot some distance above shaft 139. A short pawl hinged to this lever movable forward, but rigid in opposite direction, extends below its pivot into the path of a small tooth 188, secured to the shaft 139. The upper end of lever 189 engages rod 190, connected to crank 191. The other end of crank 191 carries a spring-pawl 192, that engages a ratchet-wheel 187, set on the shaft of platen 31, and rotates it through a space of one tooth when the rod 190 is swung forward, whereby the pawl 192 is raised upward. Every time the handle 109 is operated shaft 139 is rocked by the mechanism shown in Fig. 7 and described in connection with the "adding mechanism." Disk 116 is set on the shaft 110, to which the handle 109 is secured. Bar 141 is pivoted to the disk 116 and its slotted end 142 engages pin 143, set in a crank 140, secured to the shaft 139. On the forward movement of the handle 109 tooth 188 skips by the short pawl pivoted to lever 189, but on the return stroke of handle 109 the tooth 188, returning to its normal position, strikes against the pawl pivoted to the lower end of lever 189 and swings the latter forward, thereby raising pawl 192 and turning ratchet-wheel 187, as explained. By these means the paper is fed the space of one line every time the handle is operated to print a row of figures or a total. The actions of this mechanism are timed to feed the paper after the printing is completed.

*Inking - ribbon.*—The inking - ribbon is wound about spools 28, mounted at the top of the machine, which are rotated by any suitable means. (See Figs. 2, 5, and 6.) The ribbon is shown in its normal position in Fig. 6 and in its raised position for printing in Fig. 5. It passes through guide 65, that normally holds the ribbon below the printing-point on the platen, but it is raised every time just before a type-bar strikes the printing-line, so as to interpose it between the type and the paper on the platen. For this purpose guide 65 is suspended in the parallel arms 66, mounted on the upright 68, which at its lower end is bent rearward and secured to guide-bar 37. The lower arm 66 is in the form of a bell-crank, having its downwardly-depending arm 67 connected by rod 70 with the small crank 69, set on shaft 52. Every time just before a type-arm or type-sector is moved toward the platen shaft 52 is turned and crank 69 pushes the rod 70 forward. By this action the arm 66 is turned on its pivot and raises again the guide 65, and with it the ribbon, to the level of the printing-line.

*The type-writing mechanism.*—Near the front edge of the machine is a space-bar 5 of the usual pattern, next three rows of keys 6, arranged in the order of an ordinary type-writing machine. (See Figs. 1, 2, 3, 5, and 6.) Each key 6 is pivoted (or may be otherwise operatively connected) to one of the key-levers 7, fulcrumed at their rear ends under a bar 8 and is held up by a spring 9, whose tension is adjustable by a screw 10. A guide-plate 11 (see Fig. 13) maintains the lateral position of the front ends of the key-levers 7. On each key-lever 7 a pin 12 is set engaging in a slot of the short arm of crank 13, whose longer arm is bent and slotted at 14, the slot being engaged by pin 15, set in the type-bar 16. These type-bars 16 are appropriately-shaped pieces of sheet metal. They swing in radial slots 17 of a segmental block 18, wire 19, bent in conformity with block 18, being their common pivot. The end of each type-bar 16 is bent so that the three type engraved thereon are in vertical alinement when the type-bar is swung to bring the type in contact with the paper on platen 31. Vertical post 20, having two spreading jaws 21, forms a guide for the type at the point of printing, and curved shield 22 is provided to keep the lint falling from the inking-ribbon and other dirt from clogging slots 17 in the segmental block 18. The operation of the mechanism is the same as of an ordinary type-writing machine. The operation of the mechanism raising and lowering the carriage to the level of the three sets of type on each type-bar is explained in connection with the description of the carriage.

*Figures setting and printing mechanism.*—The mechanism thus far described comprises all parts required for all kinds of type-writing work in plain or tabulated form. When rows of figures are to be added, the mechanism for setting and printing figures operated by the "calculator-keys" must be used. The mechanism operated by the calculator-keys is arranged in nine rows, each row comprising one set and each set is operated by nine keys bearing numbers from "1" to "9," consecutively, and arranged in one column parallel with the longitudinal axis of the machine. The calculator-keys are equally spaced in all columns, forming nine transverse rows, all keys of the first row next following the type-writer keys (or the fourth row counting from the front end of the machine) bearing the numeral "1" and the keys of each following row the consecutive numeral "2," "3," &c., to "9." The calculator-keys of each of these nine columns of calculator-keys represent the digits of one denomination. (See Fig. 2.) The column nearest to the right-hand side of the machine represents units, the next following tens, hundreds, thousands, &c. Underneath each column of calculator-keys there is a longitudinally-movable rack-bar 100, that actuates the type-sector and rotates the adding-wheel of that column. For each column of these keys a separate set of working parts is provided throughout the machine, and all parts of each set are practically duplicates. As shown in Fig. 6, the stems 91 of all calculator-keys are passed through an upper guide-bar 92, supported by cross-pieces 93, and a lower guide-bar 94, supported by cross-pieces 95. Springs 96, engaging one key with each end, hold the keys in their upper (normal) position. On the right side of the stem of each key, except those of the last or ninth row, a stop 99 is provided to engage, when the keys are depressed, with the corresponding step of the longitudinally-movable rack-bar 100, one of which is provided for each column of these calculator-keys to operate the adding-wheels, as is explained further on. Each of these rack-bars is provided with a series of nine steps, one for each key of the row of calculator-keys, and the length of these steps is so proportioned that the distance of the steps from the stops of the corresponding keys increases beginning from the key bearing numeral "1" to that bearing numeral "9," successively, one dimension of the pitch of the rack 101 cut in the upper edge of rack-bar 100 for each row. The first step of each rack-bar 100 is at a distance equal to one dimension of the pitch of rack 101 from the stops 99 of the calculator-keys set in first row. The second step is two dimensions distant from the stops 99 of the stems of the second row of calculator-keys, the third step a distance equal to three dimensions of the pitch from the stops 99 of the third row of calculator-keys, and so on. Stops 99 limit the travel of rack-bars 100 when a key is depressed. For instance, if a key bearing numeral "4" is depressed in a column and the machine set in operation the travel of the corresponding rack-bar is limited to a distance equal to four dimensions of the pitch of rack 101, the rack-bar being stopped by its (fourth) step abutting on the stop of the depressed key.

Rack-bars 100 are slotted, one slot 103 being near each end, and cross-rods 102 engaging in these slots support the rack-bars and limit their longitudinal motion. The length of slots 103 is calculated to permit a longitudinal movement of the rack-bars equal to nine times the dimensions of the pitch of rack 101. These racks rotate the adding-wheels 132, as explained further on. On the forward end of each rack-bar 100, near its lower edge, is a hook 104, and a catch-plate 105, (visible in Figs. 6, 13, and 22,) pivoted between the cross-pieces 95, is held in engagement therewith by springs 98. This hook 104 and catch-plate 105 hold the rack-bars in their normal position of rest. To release them, rivet 106, set on the left side of each key-stem 91, rests on the upper edge of plate 105 when the key is in its normal position, and when the key is depressed the rivet tips the catch-plate 105, thus disengaging it from hook 104. The rack-bar 100 is therefore to be moved, as will be explained further on, toward the rear end of the machine until the corresponding step strikes the stop 99 on the stem of the depressed calculator-key.

Rack-bars 100 operate type-sectors 164. Type-sectors 164 are T-shaped segmental pieces pivoted by pin 165 to arm 166, oscillating on shaft 167. On the segmental periphery of each type-sector the type-numerals from "0" to "9" are engraved in a descending column, and by the motion of the rack-bar 100 toward the rear end of the machine the corresponding type-sector is set, so that a numeral corresponding to that of the depressed calculator-key is brought on the level of the printing-line, and the numeral indicated on the depressed key is printed when the operating mechanism is set in motion. Each type-sector 164 is pivotally connected by appropriately-curved link 163 to the rearwardly-extending arm of one of the oscillating three-armed levers 128, fulcrumed on shaft 125. The downwardly-extending arms of levers 128 are slotted, and in these slots 129 engage pins 130, set in the rack-bars 100. The third arms of levers 128 are connected by springs 131 to some fixed point of the machine (shaft 231) and to the mechanism locking all type-sectors to the left of the last printing-column. This locking mechanism is described further on. Springs 131 draw the third arms of levers 128 (pointing toward the front end of the machine) downwardly, and thus cause their downwardly-pointing arms (connected to rack-bars 100) to swing toward the rear end of the machine. The action of springs 131 is restrained by rod 127, set in crank-arms 126, rigidly secured to shaft 125, and thus held firmly against the depending arms of levers 128 until removed by the action of the operating mechanism, actuated by handle 109 and set in motion after the calculator-keys indicating the numerals to be printed are depressed. Shaft 125 projects through side plate 1", and on its projecting end crank 124 is rigidly secured thereto. Pin 123, set in the end of crank 124, engages in cam-slot 122 of disk 116, set on the main shaft 110 of the machine. In the normal position of the machine pin 123 is at the upper end of cam-slot 122, and when handle 109 is pulled forward, disk 116 rotates with shaft 110 and the pin 123 slides through the slot. Crank 124 is moved to rotate shaft 125, part of a revolution. Crank-arms 126 move with the shaft, and thereby withdraw rod 127, supported by them to the rear away from the depending arms of levers 128. When by the action of this mechanism rod 127 is removed from contact with levers 128, springs 131 act, as explained, and levers 128 draw their corresponding rack-bars 100 toward the rear end of the machine until their motion is arrested by the stop 99 of the calculator-key that was depressed in that column. By this motion corresponding in extent with numeral of the key depressed in that column type-sector 164 is set, as explained above, a motion corresponding in extent with that of the rack-bar being translated to it by link 163. Thus, for instance, if a calculator-key bearing the number "5" is depressed the rack-bar 100 is moved rearward a distance of five teeth, and the link 163 will swing the corresponding type-sector 164 the distance required to bring the type printing the figure "5" on a level with the printing-line. In the same manner when any other calculator-key is depressed the mechanism will cause the type-sector 164 to be moved so as to bring the type producing the corresponding figure on the level of the printing-line. There is one rack-bar and one type-sector for each column of calculator-keys and one set of type-sector-setting mechanism for each rack-bar and type-sector. The rack-bars of columns wherein no key was depressed stand still, being held by hook 104, engaged by catch-plate 105, as explained above.

The calculator-key last depressed in each column remains depressed until after the printing of the line is done. For this purpose a wedge-shaped lug 249 is set with the flat side up on the left side of each stem 91, and a latch-plate 97 (one for each column) is suspended between cross-pieces 93 and normally held in contact with the key-stem 91 by spring 98. When a key is depressed, this latch-plate 97 is swung to the left until the lug 249 has passed its lower edge, when it swings back and holds the key 91 in its depressed position, simultaneously releasing any other calculator-key of the same column that might have been previously depressed. For releasing the key-stem 91 the rod 107 is lowered against the projections 108 on the latch-plates 97. Thereby the lower edges of latch-plates 97 are swung out of engagement with the lugs 249, (see Fig. 22,) and the depressed key is thus released to resume its normal position. Rod 107 is moved by the operating mechanism of the machine after the printing is done.

Slotted link 197 is pivoted to the upwardly-extending arm 196 of crank 111, which is rigidly secured to main shaft 110 of the machine operated by handle 109. Pin 198, set in the short end of key-lever 199, (operated by the repeating-key R,) engages in slot 201 of this link 197, and thereby guides its motion. When handle 109 is drawn forwardly, crank-arm 196 and link 197 are swung in the same direction. The forward end of link 197 is hook-shaped and when link 197 is swung forwardly and reaches the point of its travel where pin 198 slides into the widened part of slot 201 catches and engages with the end of lever 195. Spring 200 drawing link 197 downwardly holds it in engagement with lever 195. This occurs at the end of the forward motion of handle 109. When the handle is released, crank 196 and link 197 move with it rearwardly, and link 197, being engaged with lever 195, swings it and the shaft 194 in the same direction, (from right to left in Fig. 12.)

The rod 107, mentioned above, is mounted in cranks 193, which are rigidly secured to shaft 194. Thus by turning shaft 194 as hereinbefore explained rod 107 is swung in the same direction against the projections 108 on latch-plates 97, and thereby these latch-plates are disengaged from lugs 249, (see Fig. 22,) and the stems 91 of all keys that were depressed in the preceding operation are released.

The mechanism for printing the figures set by depressing the calculator-keys is operated by handle 109, pulling it toward the front end of the machine and then releasing it, and is constructed as follows: Each of the arms 166 is engaged by an adjustable spring 168, set to swing it toward the platen 31, and thus cause the type-sector 164 to strike the paper and print. Arms 166 are held in their receded position each by a trigger 169, pivoted on rod 170 and made in the form of a bell-crank. Its upwardly-projecting arm is notched, and a small spring-plunger 173 (see Fig. 17) presses against its rearwardly-extending arm, as shown in Fig. 6. Thus when arm 166 is withdrawn to recede type-sector 164 after printing the notched arm of this trigger 169 catches in a corresponding notch of the forward-projecting tail of the arm 166 and holds it in this receded position against the tension of spring 168. Arm 166 is released to permit the spring 168 to swing the type-sector 164 against the platen by rotating the plunger 173 until its point presses upon the upwardly-projecting notched arm of the trigger 169. One plunger 173 is provided for each of the nine triggers 169; but they are all housed in one cylindrical box 174, which is pivotally mounted between the vertical plates 171, supported by cross-bars 172.

The pivot of box 174 is extended on the right-hand side of the machine through the side plate 1′, and a small lever 175 (see Fig. 7) is rigidly secured thereto. A suitable spring (not shown) keeps the box 174 in its normal position, plungers 173 being then in the position shown in Fig. 6. When the main shaft 110 is rotated, by pulling handle 109 toward the front end of the machine, then at the extreme end of the forward stroke of the handle 109 the point 176 on disk 116 strikes against the end of lever 175 and draws it in a forward direction. Thereby box 174 and the plungers 173 are turned approximately one-fourth of a revolution. The plungers 173 then act against the triggers, withdrawing them from arms 166, and thus release these arms. Springs 168 are set to move type-sectors 164 against platen 31. When the arms 166 are thus released by withdrawing the triggers 169, springs 168 drive them (and the type-sectors 164) spontaneously and forcibly against the paper supported by the platen. Their motion is similar to that of the hammer of a gun when the trigger is pulled, and thereby a clearly-cut impression of the type raised to the level of the printing-line is made. The arrangement of the mechanism whereby each individual type-sector is actuated independently of all others results in producing a clear and full impression of the type. This is desirable in all writing-machines; but it is most important in machines of this kind printing and adding figures, as will be readily understood considering the character of the work.

For receding arms 166 to their normal position after the printing rod 182, connected at each end to one crank 183 and extending laterally across all of these arms 166, is swung from right to left. Cranks 183 are rigidly secured to shaft 167, whereon the arms 166 oscillate, just inside the plates 171. This shaft 167 projects through the right side plate 1′, and on its projecting end (see Fig. 7) crank 184 is rigidly secured thereto. Link 185 connects crank 184 pivotally to disk 116, secured on the main shaft 110. When handle 109, operating shaft 110, is drawn forward, link 185 draws crank 184 toward the front end of the machine, and thereby rotates shaft 167 from left to right, and this motion swings rod 182 a sufficient distance away from arms 166 not to interfere with their motion of the type-sectors 164 to strike the paper. By the return motion of handle 109 crank 184 is moved in opposite direction. This motion rotates shaft 167 from right to left, and thereby rod 182 is swung to its position (shown in Fig. 6) and arms 166 and the type-sectors 164 pivoted thereto are again receded from platen 31 and brought into engagement with triggers 169, holding them in this receded position.

Pivot 186, connecting link 185 to disk 116, is placed a little beyond the dead-center of the motion of shaft 110, and consequently by the return motion of handle 109 rod 182 is moved some distance farther or below its position (shown in Fig. 6) and then raised again to its normal position. This is foreseen to insure a safe engagement of oscillating arms 166 with the triggers 169 after the printing operation is completed.

*Check on releasing-arms of type-sectors that were not set to print a figure.*—The mechanism here described would release the oscillating arms 166 of all nine type-sectors 164 each time the handle 109 is drawn forward, and as every type-sector carries the type "0" on the level of the printing-line when in its lowest position a row of "0's" would be printed to the left of the last column in which the type-sector was set to print a figure. To prevent this, a locking device is provided for each of the triggers 169, beginning with the second column from the right side of the machine. This locking device is made in the form of a bell-crank lever pivoted on shaft 251, transversely disposed between the plates 171. The short horizontally-disposed arm 177 of this locking device is fitted into a notch provided on the corresponding trigger 169 and drops into it when the figure-setting mechanism is receded, the long downwardly-depending arm 178 acting as an overbalance, resisting its displacement. This locking device holds the trigger 169 against the recessed tail of arm 166 and prevents disengaging of the trigger by the above-explained action of plunger 173 during the printing operation.

For releasing the triggers of the oscillating arms 166 of those type-sectors that were set to print a figure and of all to the right of the last one so set the downwardly-depending arms 178 of these locking devices are operatively connected with the type-sector-operating mechanisms. These arms 178 are shaped to form a rounded recess and an offset 179. In the forwardly-projecting arm of each lever 128 pin 180 is set, that engages the arm 178 of the corresponding locking device, the arm resting against it when the trigger is locked. When the rack-bar 100 of a column wherein a calculator-key was depressed is moved, (by the downwardly-depending arm of lever 128, as explained above,) the arm wherein pin 180 is set swings downwardly. Then pin 180 slides from the rounded recess and upon the offset 179 of arm 178 and causes the arm 178 of the locking device to swing to the right. This motion lifts the horizontally-disposed arm 177 of the locking device and disengages it from the notch of trigger 169. The trigger 169 is then free to yield to the action of plunger 173 and to release the oscillating arms 166 to perform the printing operation.

The locking devices of all columns to the right are released simultaneously. For this purpose at the end of each arm 178 a short projection is bent to the left, forming finger 181, overlapping the arm 178 of the locking device in the column next adjoining on the left. By these overlapping fingers 181 the locking devices of all columns to the right of the last one in which a calculator-key was depressed are simultaneously released by the motion of lever 128 of that column, while the locking devices of all columns to the left from it remain locked.

*Adding mechanism.*—The construction of the calculating device of this machine is based on the principle that if in a machine having numbers-printing mechanism arranged in columns, one column for each denomination, and spur gear-wheels, one for each column, are connected with the numbers-printing mechanism by devices causing the gear-wheel of each column to rotate for a distance corresponding to the number marked on the depressed key and the gear-wheels connected with mechanism causing the wheel of the column of a next higher denomination to rotate a distance of one tooth when the wheel of the adjoining column of a lower denomination has rotated a distance of ten teeth or more, the total or aggregate of all numbers (or rows of numbers) printed on the machine is thus constantly represented by the position of the gear-wheels relatively to their zero-point, and that if these gear-wheels are so operatively connected with the numbers-printing mechanism to set the type-sectors when reversed each to print the figure corresponding to the position of its corresponding gear-wheel, the row of numbers thus set and printed must be the total of all numbers or rows of numbers successively printed during the preceding operations.

The mechanism for such adding and printing of the total in my improved machine is shown in connection with the other features of the machine in Figs. 4, 6, and 7, and the several parts of the adding mechanism are shown separately and in detail in Figs. 8, 9, 10, and 11 and also in Figs. 25, 26, 30, and 31. The mechanism is constructed and combined with the other parts of the machine as follows:

Near the rear end of the machine frame 134 is mounted to oscillate, as will be explained further on, on shaft 135, transversely disposed between and supported in plates 1 and 1′. In this oscillating frame 134 shaft 133 is set, and adding-wheels 132 are mounted to rotate thereon. They are set in alinement with rack-bars 100, and their teeth (twenty on each wheel) are proportioned to mesh with the teeth of racks 101. Each adding-wheel has on its left side a two-pointed diamond-shaped cam 136 projecting from the body of the wheel for a distance approximately equal to its width. The points of these cams correspond in shape and dimensions with the teeth of the adding-wheels and coincide with two of these teeth which are diametrically opposite each other. These stops 136 thus divide the periphery of each adding-wheel into two equal parts, each containing nine (9) teeth, counting from one point of the cam to the other.

Frame 134 is held in its normal position by spring 144, and when so held the adding-wheels 132 are above and out of contact with the rack-bars 100. For depressing the frame (to move the adding-wheels 132 in engagement with racks 101) the following mechanism is provided: On the left-hand end plate of frame 134 a boss 137 is provided. (See Figs. 25 and 26.) Above it cam 138 is set on shaft 139 and held by spring 238 in alinement with boss 137. Thus when shaft 139 is rotated a distance approximately forty-five degrees from right to left the cam 138 acts on the boss 137 to depress frame 134 and to bring the adding-wheels 132 in operative engagement with the racks 101. The rotating of shaft 139 is effected by mechanism illustrated in Fig. 7 and constructed as follows:

The end of shaft 139 is projected through the plate 1′ on the right-hand side of the machine and crank 140 is rigidly secured thereto. Connecting-rod 141, pivoted to disk 116, (rigidly secured to the main shaft 110 of the machine,) is connected to crank 140 by pin 143, screwed in the end of the crank and engaging in slot 142 of the connecting-rod 141. Slot 142 is sufficiently long to permit shaft 110, actuated by handle 109, to be rotated nearly the full extent of the forward motion of the handle 109 before its motion is transmitted to the crank 140; and again when by the return motion of the handle main shaft 110 is rotated from left to right slot 142 permits the connecting-rod 141 to slide on pin 143 for the same extent of the motion of the main shaft 110 before its action is transmitted to shaft 139. The intermission in the forward motion is necessary to permit rack-bars 100 to be moved inwardly, as explained above in connection with the number-printing mechanism, before shaft 139 is turned to depress frame 134 and bring the adding-wheels in engagement with racks 101. The intermission in the rearward motion is required to keep the adding-wheels in operative engagement during the return motion of the racks. Thus the adding-wheels 132 are brought in engagement with racks 101 at the end of the forward motion of the handle 109 after the rack-bars 100 completed their inward motion to the extent controlled by the depressing of one of the number-bearing keys in each column and are held in such engagement during the return motion of rack-bars 100 until (at the end of the return motion of the handle 109) the pin 143 comes in contact with the other end of slot 142. Then connecting-rod 141 pulls crank 140 toward main shaft 110, and thereby turns shaft 139 to raise cam 138 from boss 137. Springs 144 then return frame 134 to its normal position above racks 101, thereby withdrawing the adding-wheels 132 from engagement with them.

It was already explained that at each operation of the machine each rack-bar 100 travels a distance equal to such number of teeth on rack 101 as indicated by the number on the key depressed in each column, and inasmuch as the extent of the return travel of the rack-bars 101 after each printing operation is equal to their inward motion and the teeth of the adding-wheels mesh with those of racks 101, each adding-wheel is rotated during each printing operation a distance (number of teeth on their periphery) exactly equal to the extent of the motion of its corresponding rack-bar. For instance, when in one column the key bearing number "5" is depressed, the rack-bar travels and the adding-wheel of this column is rotated a distance equal to five (5) teeth on its circumference.

During every printing operation only the adding-wheels of those columns wherein a key was depressed are rotated, each independently of all others and each a number of teeth equal to the number indicated on the depressed key. The rotation of each adding-wheel is resumed at each subsequent operation (for which a key is depressed in its respective column) from the point where it terminated in the preceding operation, or, in other words, in each subsequent printing operation, the adding-wheel of each column wherein a key was depressed is rotated farther from the point where it stopped in its last preceding operation a distance (number of teeth on its circumference) equal to the number indicated on the key depressed.

*The carrying device.*—Whenever the total distance of two or more successive rotations of any of the numbering-wheels, reckoned by the number of teeth on its circumference, reaches or exceeds ten (10), the adding-wheel of the column next adjoining to the left is rotated a distance equal to one (1) tooth, irrespectively whether a key in its column was depressed or not. The mechanism for effecting this motion, collectively designated herein as the "carrying device," is constructed as shown in Figs. 4, 6, and 7, and independently of other parts of the machine in Figs. 8, 9, 10, 11, 30, and 31. These figures show the relative positions of the parts of this mechanism at the successive stages of the operation.

For each of the adding-wheels 132 (except the adding-wheel of the unit-column on the right-hand side of the machine) an oscillating rack 145 is provided. These racks are pivoted on shaft 146 in such position that the teeth of each adding-wheel 132 engage with the teeth of its corresponding rack 145 when the frame 134 is raised to its normal position and the adding-wheels 132 disengaged from racks 101 at the end of the return motion of the rack-bars, as already explained. To each one of these racks 145 is pivoted a supplemental check-piece 147 to oscillate thereon between pins 152 and 153, set in the racks 145. A coiled spring 154 having one end fastened to pin 252, set in the right-hand end of rack 145, and the other pin 253 set in the piece 147, draws the latter toward pin 153 to prevent locking of the parts, and coiled spring 162, having one end fastened to pin 254, set in the piece 147, and the other to shaft 135, draws both the rack 145 and piece 147 in the direction of this shaft. The extent of this motion is calculated to rotate the adding-wheel a distance of one (1) tooth. Both springs act when the "carrying" mechanism is released by the aforedescribed cam 136, as will be explained farther on, to perform the "carrying operation." During all other operations of the machine pin 148, set in the supplemental piece 147, is engaged by the oscillating hook 149 (see Fig. 8) and holds the mechanism locked.

Hooks 149 are mounted on shaft 150, set in frame 134, each one between two adjoining adding-wheels and in line with cams 136. They are bent sidewise, as shown in Fig. 4 and more clearly in Fig. 30, the object of thus bending the hooks being to bring the notch, engaging pin 148, in line with the pin 148 of the carrying device, operating the adding-wheel of the next column to the left, while the point 151 of each hook is in line with the stop of the adding-wheel 132 of the column on the right side thereof. These points 151 of hooks 149 are curved on the side toward shaft 150 and sharply recessed on the other side to allow cams 136 to slide thereon and lift the hook when the adding-wheel 132 is rotated from left to right, whereas when the adding-wheel is rotated reversely, or from right to left, (when setting the total,) the cam 136 abuts against it and terminates the reverse motion of the adding-wheel.

Two crank-arms 155 are secured to shaft 135 just within the sides of frame 134, and upon the ends thereof is secured bar 156. Shaft 135 projects through the right-hand side plate 1′ of the machine, and to its projecting end is secured arm 160, the arm 155, shaft 135, and arm 160 thus constituting a crank. Disk 116 (secured to the main shaft 110) is connected by link 159 to arm 160. (See Fig. 7.) One end of link 159 is pivoted to arm 160, while in its other end pin 158 is set that engages in the cam-slot 157 of disk 116. By this mechanism bar 156 is brought during the process of adding into three different positions. (Shown, respectively, in Figs. 8, 9, 10, and 11.) Fig. 8 shows it in its normal position when the operating-handle 109 of the machine is in its position of rest. The two other positions of bar 156 are indicated in the same figure in dotted lines. Fig. 9 shows its position when handle 109 is moved to its extreme forward position. Fig. 10 shows its position during the return motion of handle 109 while the rack-bars 100 travel, returning to their normal position, and rotate the adding-wheels 132 from left to right. Fig. 11 shows the bar 156 returned to its normal position. The lower end of arm 160 is pointed and engages the notched spring-actuated stop 161. These notches are provided to hold arm 160 (and consequently bar 156) in its two stationary positions.

Whenever during the printing operations any of the adding-wheels 132 is rotated (from left to right) beyond one of the two points of cams 136, (its decimal dividing points,) one of the cams 136 strikes against the point 151 and sliding thereon raises hook 149 from pin 148. The check-piece 147 being thereby released is drawn by spring 162 against bar 156, and the pin 148 being thereby swung beyond the notch of hook 149 this hook is prevented from reëngaging it again and rests on it. (See Figs. 10 and 11.) Thereby the carrying device is unlocked or released and its further motions are governed by the action of the bar 156, which is then in the position shown in Fig. 10, (the operating-handle 109 being then at the beginning of its return stroke.) After the rotating of the adding-wheels 132 by their respective rack-bars 100 is completed and after they are removed from engagement with racks 101 and brought in engagement with racks 145 (by the raising of frame 134) and just before the completing of the return stroke of handle 109 cam 157, (see Fig. 7,) acting as explained on connecting-rod 159, draws arm 160 toward the main shaft 110, and its pointed end slips into the first notch of stop 161. By this action shaft 135 is rotated into the position shown in Figs. 8 and 11 in full lines. This sets the racks 145 and the supplemental check-pieces 147 of those of the carrying devices that were unlocked or released, as explained above, free to swing toward shaft 135. The extent of this rearward swing is limited (that of the supplemental piece 147 by bar 156 and that of rack 145 by pin 152) to rotate the engaged adding-wheel 132 a distance exactly to one tooth of its circumference. Each of the racks 145 of every column where carrying is to be performed is thus swung from left to right and rotates its corresponding adding-wheel by its motion in the same direction as the rack-bars rotate it when returning to their normal position.

After the carrying operation is completed racks 145 remain in engagement with their respective adding-wheels, the carrying devices unlocked and bar 156 in the position shown in Figs. 8 and 11, until the next printing operation is being performed. Then by drawing handle 109 toward the front end of the machine frame 134 is lowered, the adding-wheels 132 are disengaged from racks 145 and brought in engagement with racks 101, and the mechanism operating bar 156 moves it into the position shown in Fig. 9. When moving into this position, bar 156 pushes the supplemental piece 147 (against the action of springs 154 and 162) in contact with pin 152 and then pushes both the rack 145 and the supplemental piece 147 farther in the same direction until their motion is arrested by shaft 139, against which the upward projecting end of rack 145 abuts. When these parts of the carrying device are brought in this position, pin 148 is exactly underneath the notch of hook 149. The hook then drops and interlocking with pin 148 locks the carrying device, prevents its operation until hook 149 is again raised by one of the cams 136 of its corresponding adding-wheel 132, as explained above.

*The total-key—Printing the total.*—To produce and print the total, the adding mechanism must be operated to engage the adding-wheels 132 with the rack-bars 100 and then to rotate each of the adding-wheels reversely to their zero or stopping points, whereby the rack-bars 100 are moved to set their corresponding type-sectors 164, according to the position of each adding-wheel. When thus rotating reversely, (in a direction opposite to that when adding,) each adding-wheel 132 draws its rack-bar inwardly until its motion is arrested by its cam 136 abutting against point 151 of hook 149 of the carrying device. Each rack-bar 100 is thus drawn the distance required to set its corresponding type-sector to raise the type of the numeral corresponding to the position of the adding-wheel on the level of the printing-line. This numeral is equal to the number of teeth on that part of the periphery of the adding-wheel intervening between the starting-point of its reversed motion and the next point to the left of its cam 136. The mechanism "setting the total" is brought in operative engagement with the other coacting parts of the machine by depressing the "total-key," marked "T" on the keyboard (see Fig. 2) and located to the left of the calculator-keys. The stem of this key is connected to one arm of bell-crank 213, pivoted to the left side plate, and its other arm is connected with the sliding bar 214, so that by depressing key T the sliding bar 214 is drawn toward the front end of the machine. On the farther end of this bar 214 wedges 237 and 215 are provided, wedge 237 in position to act upon cam 138 to push it beyond boss 137 and the wedge 215 in position to act upon the end of shaft 150, projecting beyond frame 134 and underneath bar 214 (see Fig. 26) to depress frame 134 when the bar 214 is drawn forward. The effect of this action of wedge 215 upon frame 134 is the same as that of cam 138 when shaft 139 is rotated and moves the adding-wheels 132 in engagement with racks 101 at the beginning of the operation (See Figs. 25, 26, and 32.) Underneath bar 214 shaft 217 is rotatably mounted in the side plates 1 and 1′, (see Figs. 6 and 32,) and appropriately-shaped fingers 216 are set in this shaft in position to engage one finger with each of the latch-plates 105. Slotted link 218, rigidly secured to shaft 217, engages pin 219, set in bar 214. When bar 214 is drawn forward by depressing the total-key T, the upper end of link 218 is carried with it, shaft 217 is rotated from right to left, and thereby the fingers 216 are pressed upon their corresponding latch-plates 105, thereby disengaging it from hook 104. This sets rack-bars 100 free to move inwardly when handle 109, operating the number setting and printing mechanism, is drawn forward, and each rack-bar then travels inwardly until its motion is arrested by the stopping of the adding-wheel engaged with it. The setting and printing of the total is effected (after the total-key T is depressed) in the same manner and by the same mechanisms as the setting and printing of any row of figures determined by depressing the calculator-keys. The only difference is that while in printing a row of figures by depressing the calculator-keys these latter limit the motion of rack-bars 100, and these again control the rotating motion of the adding-wheels 132, in the operation of setting and printing the total (for which no calculator-keys are depressed) the adding-wheels 132 control the motion of the rack-bars. Thus when the handle 109 is drawn forward each rack-bar is moved inwardly (toward the rear end of the machine) until the cam 136 of its corresponding adding-wheel 132 strikes against the point 151 of hook 149. The type-sector-operating mechanism connected with each rack-bar swings the type-sector 164 proportionately to the motion of the rack-bar—that is to say, if the stop of an adding-wheel is located a distance of seven teeth from point 151 of hook 149 the corresponding rack-bar 100 will be moved toward the rear end of the machine the distance of seven teeth, and the type-sector-operating mechanism will swing its corresponding type-sector 164 so as to bring the figure "7" on level with the printing-line.

When the type representing the "total" are thus set, the printing mechanism acts in the same order as explained in connection with the number setting and printing mechanism.

*Lock for total-key.*—To prevent any possibility of error in setting and printing the total, bar 214 is locked during the operation of setting and printing the total, the wedge 215 holding the frame 134 depressed and the adding-wheels 132 in engagement with rack-bars 100, in its forward position, into which it is brought by depressing the total-key T. This locking device acts immediately when after depressing the total-key T the handle 109 is drawn toward the front end of the machine to effect the setting and the printing of the total, as above explained, and holds bar 214 in its forward position and the adding-wheels safely in engagement with the rack-bars during the entire operation of setting and printing the total. The locking device is constructed as follows: Pin 221 is secured in bar 214 to project from it toward the left-hand plate 1 of the machine, (see Figs. 6 and 32,) and a bell-crank locking-lever is pivoted to the left-hand-side plate 1 of the machine in position to engage it with its longer notched arm 220 when bar 214 is drawn forwardly by depressing the total-key. This bell-crank locking-lever oscillates freely on its pivot, and its arm 220 being longer than its depending arm 222 has a tendency to drop. The locking-lever is operated by pins 223 and 225 set in curved arm 224, rigidly secured to the main shaft 110 between the plate 1 and the arm 222 of the locking-lever. Pin 223 is set in position to engage with its arm 222 when the main shaft 110 is in its position of rest (handle 109 operating it standing upright, as shown in Fig. 1) at the beginning of the operation of setting and printing the total. When its arm 222 is thus engaged by the pin 223, the locking-lever is held in the position shown in Figs. 6 and 32, its notched arm 220 being then above the pin 221. In that position the bar 214 is free to move. By depressing the total-key T bar 214 is drawn forwardly, and then pin 221 stands underneath the notch of the hooked arm 220. At the beginning of the forward motion of handle 109 pin 223 recedes from arm 222 and then arm 220 drops and engaging with pin 221 locks bar 214 in its forward position. The other pin 225 is set in the end of arm 212 in position to strike against the arm 220 of the locking-lever at a point beyond the pin 221 when the main shaft of the machine is rotated one-quarter (¼) of its revolution. This occurs at the end of the forward stroke of the handle 109. Arm 220 of the locking-lever remains in engagement with pin 221, holding bar 214 against the tension of spring 226 (see Fig. 4) until just before the completion of the forward stroke of handle 109, when (after the type-sectors were set, the motion of rack-bars 100 arrested by the cams 136 of the adding-wheels 132, and the total was printed) the pin 225 strikes against the head of arm 220 of the locking-lever, projecting beyond pin 221, lifts it from engagement with pin 221, and again releases bar 214 to recede, thus releasing frame 134 to rise and lift adding-wheels 132 from engagement with racks 101. Simultaneously wedge 237 slides off cam 138, releasing spring 238 to shift cam 138 from the position shown in broken lines in Fig. 26 to its normal position shown there in full lines.

*Saving and clearing the total.*—The total after being set and printed may be saved or the machine may be "cleared" at the completing of the forward stroke of handle 109. If it is desired to "save" the total in the machine—as, for instance, when further addition to it is to be made—the total-key T must again be depressed or held depressed by the hand of the operator when the handle 109 is released. In such case the adding-wheels are retained in engagement with the rack-bars, and then each of these returning to its starting position will rotate its corresponding adding-wheel 132 from left to right the same distance as the adding-wheel rotated in setting the total. If it is desired to "clear" the machine—that is, to leave the adding-wheels at their zero positions—the total-key T is not again depressed after the handle 109 is drawn forward. When the handle 109 is then released, bar 214 recedes to its position and frame 134 rises and lifts the adding-wheels 132 out of engagement with the rack-bars before the latter have moved.

The rack-bars 100, propelled by springs 131, will spring backward the full distance of the slot 103 when the total-key T is not again depressed at the end of the forward stroke of the handle 109. Therefore a mechanism is provided for holding them until mechanism operating rod 127 acts to return them to their forward position, where they are then secured by catch-plates 105. This mechanism comprises a series of ratchet-teeth 227 cut in the bottom edge of each rack-bar 100, spring-pawls 228, one for each rack-bar, mounted on shaft 149, rod 229 holding the spring-pawl out of engagement with the ratchet-teeth 227, (see Fig. 6,) and mechanism for raising rod 229 at the end of the forward stroke of the handle 109 when bar 214 is released. The mechanism operating rod 229 is constructed as follows: Rod 229 is mounted in the ends of two cranks 230, secured to a shaft 231. Its right-hand end extends through a suitably-shaped opening 255 in the right-hand side plate 1′ and also through the diagonal slot 232 in the sliding bar 233. (See Fig. 7.) Pins 234 and 235 are secured to sliding bar 233 in position to be engaged by lug 236, located on the inside of disk 116, turned toward plate 1′ alternately as the disk is rotated. When handle 109 is drawn forwardly, lug 236 strikes in the last part of this motion against the pin 234 and shifts the bar 233 toward the rear. Rod 229 slides through slot 232 and is thereby raised. The spring-pawls 228 being thus released engage in the ratchet-teeth 227 of the rack-bars 100 and hold them in position until rod 127 is operated, as explained above, to recede them. When handle 109 is released, lug 236, moving with disk 116, strikes pin 235 and shifts bar 233 to its original position. Rod 229 is thereby brought in its lowest position and withdraws pawls 228 from the rack-bars.

*The several operations of the machine.*—The described arrangements of the machine enable the operator to constantly observe and read his work, and to do so he is not required to displace or move any of its parts. All writing or printing is done on the front side of platen and right where the operator looks when using the machine. Ordinary type-writing is performed on the machine in the same manner as on any type-writing machine, the operator depressing the keys designated by the respective letters alternately with the spacing-bar. The keys and the spacing-bar both operate the mechanism for shifting the carriage laterally. The paper-feed is operated at the end of each line after the carriage is returned to its starting position.

Tabulated work—that is, work comprising type-writing and figure-printing—is performed as follows: First, the tabulated stops 74, of which there may be as many as desired or required for any particular work, are set in the proper places, determined on scale 34, and then the writing in the first column is done. Then the tabulating-lever 80 (see Fig. 12) is drawn forwardly, whereby the carriage is moved to the left until the first of the tabulating-stops 74 reaches the printing-point. The tabulating-lever is then released and the writing or printing in the next column is done. This releasing of the tabulating-lever reverses bumper 78 to its normal position without changing the position of the carriage, and thus when the tabulating-lever 80 is again drawn forward the carriage is shifted farther to the left until the second of the tabulating-stops reaches the printing or writing point of the second column. Then the tabulating-lever is again released, and the writing or printing is done. This process is repeated as many times as there are columns to be tabulated.

When in any form of work there are figures to be added the operator must use the calculator-keys, depressing for each figure the corresponding key in the column of that denomination. To correct an error—for instance, the depressing a wrong key in a column—it is only necessary to depress the right key in that column before the printing is done. Thereby the erroneously-depressed key is automatically released and returns to its normal position. When the whole figure is thus marked by depressing the requisite calculator-keys in each column, the operator draws handle 109 toward the front end of the machine. This effects the printing of the figure on the same line on the front side of the platen 31, where the type-writing is done and in line of vision of the operator.

The operator cannot draw the handle beyond the terminus of its forward motion. The pawl 118 (see Fig. 7) arrests it. If he should not draw it far enough to accomplish all of the requisite operations, the handle 109 will not return when released, being held by the same pawl 118. This pawl is not reversed until after pin 256 strikes tongue 121, and this cannot occur until the forward motion of handle 109 is completed. During the return motion of handle 109 the adding mechanism is operated, as explained, the depressed keys are released, and all parts of the machine are set in position for new operation. The printing and simultaneous adding operation are repeated as many times as there are numbers or rows of numbers to be printed and added.

Whenever the total is to be taken—that is, set and printed—the operator depresses the total-key T and draws the handle 109 toward the front end of the machine the same as when setting and printing in other rows of figures. If after taking and printing total it is desired to clear the machine, the operator releases the total-key after drawing the handle 109 forwardly. If it is required to preserve the total in the machine—when, for instance, further numbers or rows of numbers are to be added thereto—the operator holds the total-key depressed during the return motion of handle 109.

When it is desired to repeat the printing of any number or rows of numbers two or more times in succession—as, for instance, when transferring the total at the end of one sheet to the top of another sheet—the operator depresses the key marked "R" in Fig. 2. This key is the terminus of the longer arm of lever 199, pivoted in the left-hand-side plate 1. In the end of its other shorter arm pin 198 is set, engaged in slot 201 of hook 197, and guides its motion. Normally hook 197 catches, always at the end of the forward motion of handle 109, lever 195, (see Fig. 12,) operating the mechanism releasing the stems of the depressed keys. By depressing the repeating-key R the short arm of lever 199 is swung upwardly, the path of hook 197 is shifted beyond the reach of lever 195, and consequently the lever is not moved and the keys are not released. Then the parts of the type-setting mechanism repeat at every subsequent forward moving of handle 109 the same operation as long as key R is held depressed.

When invoicing-work is to be done on the machine, the operator begins with the words on the line. These are written by the typewriting mechanism. Then the sets the tabulating-stop in position where the row of figures is to be printed, sets the type for numbers by depressing the requisite calculator-keys, and then draws the handle 109 forwardly and releases it. This operation is repeated as many times as there are items on the invoice to be printed, whereupon the operator depresses the total-key and draws the handle forward to set and print the total.

It is not well possible to enumerate all of the many different forms of work that may be performed on this machine; but from explanations herein given as to the performing of these particularly-explained forms of work any operator will readily understand how to perform any other work of whatever combination or character.

I claim as my invention—

1. A printing-machine, comprising a platen, a plurality of segmental type-sectors having types engraved on their peripheries; means for movably supporting each of the type-sectors separately from all others; means for receding the type-sectors from the platen and means for holding them in receded position; mechanisms, one for each type-sector, for rotating them, each independently of all others; means for varying the extent of the rotary motion of each of the type-sectors-rotating mechanisms; keys, bearing designations of the type engraved on the type-sectors, arranged in columns, one column for each of the mechanisms rotating the type-sectors; means connected with each of these keys to engage, when depressed, and control the motion of the mechanism, rotating the type-sector, to move it a distance exactly corresponding with the type indicated by the depressed key, means for releasing the type-sectors after their rotating motion is completed, and means for forcibly propelling each type-sector, independently of all others, toward the platen.

2. A number-printing machine, comprising a platen, a plurality of segmental type-sectors having types of numerals engraved on their peripheries; means for movably supporting each of the type-sectors separately from all others; means for receding the type-sectors from the platen and means for holding them in receded position; mechanisms, one for each type-sector, for rotating them, each independently of all others; means for varying the extent of the rotary motion of each of the type-sectors-rotating mechanisms; keys, bearing successive numbers, arranged in columns, one column for each of the mechanisms rotating the type-sectors; means connected with each of these keys to engage, when depressed, and control the motion of the mechanism rotating the type-sector to move it a distance exactly corresponding with the number indicated by the depressed key, means for releasing the type-sectors after their rotating motion is completed, and means for forcibly propelling each type-sector, independently of all others, toward the platen.

3. A printing-machine, comprising a platen, a plurality of movable supports, means for moving the supports from the platen and means for holding them in that position; segmental type-sectors, one pivoted to each of the movable supports, and each having types engraved on its periphery; mechanisms for actuating the type-sectors, each independently of all others, to swing on its pivot; means for varying the extent of the motion of each of the type-sector-actuating mechanisms; keys, bearing designations of the type engraved on the type-sectors, arranged in columns, one column for each of the mechanisms actuating the type-sectors; means connected with each of these keys to engage, when depressed, and control the motion of the mechanism actuating the type-sector, to swing the type-sector a distance exactly corresponding with the type indicated by the depressed key, means for releasing the movable supports after the type-sectors are set, and means for forcibly propelling each of the movable supports, independently of all others, toward the platen.

4. A number-printing machine, comprising a platen, a plurality of movable supports, means for moving the supports from the platen and means for holding them in that position; segmental type-sectors, one pivoted to each of the movable supports, and each having types of numerals engraved on its periphery; mechanisms for actuating the type-sectors, each independently of all others, to swing on its pivot; means for varying the extent of the motion of each of the type-sector-actuating mechanisms; keys, bearing successive numbers, arranged in columns, one column for each of the mechanisms actuating the type-sectors; means connected with each of these keys to engage, when depressed, and control the motion of the mechanism actuating the type-sector, to swing the type-sector a distance exactly corresponding with the number indicated by the depressed key, means for releasing the movable supports after the type-sectors are set, and means for forcibly propelling each of the movable supports, independently of all others, toward the platen.

5. A printing-machine, comprising a platen, a plurality of oscillating arms, means for receding the arms from the platen, and means for holding them in their receded position; segmental type-sectors, pivoted, one to each of the oscillating arms, and each having types engraved on its periphery; mechanisms for actuating the type-sectors, each independently of all others, to swing on its pivot; means for varying the extent of the motion of each of the type-sector-actuating mechanisms; keys, bearing designations of the type engraved on the type-sectors, arranged in columns, one column for each of the mechanisms actuating the type-sectors; means connected with each of these keys, to engage, when depressed, and control the motion of the mechanism actuating the type-sector, to swing it a distance exactly corresponding with the type indicated by the depressed key, means for releasing the oscillating arms after the type-sectors are set, and means for forcibly propelling each of the arms, independently of all others, toward the platen.

6. A numbers-printing machine, comprising a platen, a plurality of oscillating arms, means for receding the arm from the platen, and means for holding them in their receded position; segmental type-sectors, pivoted, one to each of the oscillating arms, and each having types of numerals engraved on its periphery; mechanisms for actuating the type-sectors, each independently of all others, to swing on its pivot; means for varying the extent of the motion of each of the type-sector-actuating mechanisms; keys, bearing successive numbers, arranged in columns, one column for each of the mechanisms actuating the type-sectors; means connected with each of these keys to engage, when depressed, and control the motion of the mechanism actuating the type-sector, to swing it a distance exactly corresponding with the number indicated by the depressed key, means for releasing the oscillating arms after the type-sectors are set, and means for forcibly propelling each of the arms, independently of all others, toward the platen.

7. A printing-machine, comprising a platen, a plurality of oscillating arms, means for receding the arms from the platen and means for holding them in their receded position; segmental type-sectors, one pivoted to each of the oscillating arms and having types of numerals engraved on their peripheries; longitudinally-movable bars, one for each of the type-sectors, and mechanism for moving the bars; a shaft, transversely disposed above the movable bars; levers, mounted on the shaft, and each having one arm connected to one of the movable bars; links, one connected to the other arm of each of the levers and to one of the type-sectors; means for varying the extent of the motion of the bars; keys, bearing successive numbers, arranged in columns, one column for each bar; means connected with each key to engage, when depressed, with the corresponding movable bar and to limit its motion to a distance exactly corresponding with the number indicated on the depressed key; means for releasing the oscillating arms after the motion of the bars is completed, and means for forcibly propelling each of the oscillating arms, independently of all others, toward the platen.

8. A printing-machine, comprising a platen, mechanisms for setting type and printing on the platen, each of the mechanisms comprising an oscillating arm, means for propelling the arm, independently of all others, toward the platen, means for receding the arm from the platen and means for holding it in receded position; a type-sector, having type engraved on its periphery, pivoted to the arm; mechanism for moving the type-sector on its pivot; keys, bearing consecutive numbers, arranged in column in line with the mechanism operating the type-sector; means connected with each of the keys to engage, when depressed, the mechanism actuating the type-sector and thereby to limit its motion to an extent corresponding with the number indicated on the depressed key, means for actuating the mechanism moving the type-sectors on their pivots, and means for releasing the oscillating arms after the motions of the type-sectors are completed.

9. A printing-machine, comprising a platen, mechanisms for setting type and printing on the platen, one set for each arithmetical denomination, and each set comprising an oscillating arm, means for propelling the arm, independently of all others, toward the platen, means for receding the arm from the platen and means for holding it in receded position; a type-sector, having type engraved on its periphery, pivoted to the arm; mechanism for moving the type-sector on its pivot; keys, bearing consecutive numbers, arranged in column in line with the mechanism operating the type-sector; means connected with each of the keys, to engage, when depressed, the mechanism actuating the type-sector and thereby to limit its motion to an extent corresponding with the number indicated on the depressed key, means for actuating the mechanism moving the type-sectors on their pivots, and means for releasing the oscillating arms after the motions of the type-sectors are completed.

10. A printing-machine, comprising a platen, a plurality of oscillating arms, means for receding the arms from the platen and means for holding them in their receded position; segmental type-sectors, one pivoted to each of the oscillating arms and having types of numerals engraved on their peripheries; longitudinally-movable bars, one for each of the type-sectors, and mechanism for moving the bars; a series of successively-arranged steps on each of the movable bars; a shaft, transversely disposed above the bars; levers, one for each bar, mounted on the shaft, and each having one arm connected to one of the movable bars; links, one pivoted to the other arm of each lever and to one of the type-sectors; keys, bearing successive numbers, arranged in columns, one column for each movable bar; stops, provided on the stems of the keys, to engage, when depressed, one of the steps on the movable bars; means for releasing the oscillating arms after the motion of the bars is completed, and means for forcibly propelling each of the oscillating arms, independently of all others, toward the platen.

11. A printing-machine, comprising a platen, a plurality of oscillating arms, means for receding the arms from the platen and means for holding them in their receded position; segmental type-sectors, having types of numerals engraved on their peripheries, pivoted to the oscillating arms; longitudinally-movable bars, one for each of the type-sectors, mechanism for moving the bars, and means for transmitting the motion of each bar to its corresponding type-sector to swing it a distance proportionate to the motion of the bar, hooks on the bars; spring-actuated catch-plates, set in position to engage with the hooks; keys, bearing successive numbers, arranged in columns, one column for each of the movable bars; means provided on the stems of the keys to disengage, by depressing a key, the catch-plate from the hook of the corresponding movable bar; means, provided in connection with the keys and with the movable bars, to limit, by depressing one of the keys, the motion of the corresponding-movable bar to a distance exactly corresponding with the number indicated on the depressed key; means for releasing the oscillating arms after the motion of the movable bars is completed, and means for forcibly propelling each of the oscillating arms, independently of all others, toward the platen.

12. A printing-machine, comprising a platen, a plurality of oscillating arms, means for receding the arms from the platen and means for holding them in their receded position; segmental type-sectors, one pivoted to each of the oscillating arms and having types of numerals engraved on their peripheries; longitudinally-movable bars, one for each of the type-sectors, and mechanism for moving the bars; steps, successively arranged on each of the movable bars, a shaft, transversely disposed above the bars, levers, one for each bar, mounted on the shaft, and each having one arm connected to one of the movable bars; links, one pivoted to the other arm of each lever and to one of the type-sectors; keys, bearing successive numbers, arranged in columns, one column for each of the movable bars; stops, provided on the stems of the keys, in position to engage, when depressed, one of the steps on the bars; means for locking the keys in depressed position; means for releasing the oscillating arms after the motion of the bars is completed; means for forcibly propelling each of the oscillating arms, independently of all others, toward the platen; and means for releasing the keys locked in depressed position after the printing operation is completed.

13. A printing-machine, comprising a platen, a plurality of oscillating arms, means for receding the arms from the platen, segmental type-sectors, pivoted to the oscillating arms, one to each arm, separate mechanisms for moving the type-sectors on their pivots; keys, bearing successive numbers, arranged in columns, one column for each of the mechanisms moving the type-sectors; mechanisms for controlling, by depressing one of the keys in each column, the motion of the mechanisms swinging the type-sectors; a shaft, bell-crank-shaped triggers, one for each of the oscillating arms, fulcrumed thereon, and each having one arm notched in position to engage with the corresponding oscillating arm; spring-actuated plungers, movably mounted in position to engage the arms of the triggers, means for moving the plungers, and means for forcibly propelling the oscillating arms, toward the platen.

14. A printing-machine, comprising a platen, a plurality of oscillating arms, means for receding the arms from the platen, segmental type-sectors having type engraved on their periphery, pivoted one to each of the oscillating arms, separate mechanisms for moving the type-sectors on their pivots; keys, bearing successive numbers, arranged in columns, one column for each of the mechanisms moving the type-sectors; mechanism for controlling, by depressing one of the keys in each column, the motion of the mechanisms swinging the type-sectors; a shaft, bell-crank-shaped triggers, one for each of the oscillating arms, fulcrumed thereon, and each having one arm notched in position to engage with the corresponding oscillating arm; spring-actuated plungers movably mounted in position to engage the arms of the triggers, means for moving the plungers; recessed abutments, one provided on each trigger; a shaft, bell-shaped check-levers, one for each trigger, fulcrumed on the shaft in position to engage the recessed abutments of the triggers; means, operatively connected with the mechanism operating the type-sectors, for raising the check-levers out of engagement with recessed abutments when the type-sector is moved; and means for forcibly propelling the oscillating arms, toward the platen.

15. An arithmograph, comprising a type-writing mechanism and mechanism for setting and printing of numbers, two sets of keys arranged in successive rows on a common keyboard, the keys of one set being operatively connected with the type-writing mechanism and the keys of the other set provided with means to engage, when depressed, with the mechanism for setting and printing of numbers, and thereby to control the setting of the numbers, and mechanism for actuating the mechanism for setting and printing of numbers.

16. An arithmograph, comprising a type-writing mechanism, and mechanism for setting and printing of numbers; a keyboard, two sets of keys arranged in successive rows on the keyboard, the keys of one set being operatively connected with the type-writing mechanism, and the keys of the other set provided with means to engage, when depressed, with the mechanism for setting and printing of numbers, and thereby to control the setting of the numbers to be printed, and means for actuating the mechanism for setting and printing of numbers.

17. An arithmograph, comprising a type-writing mechanism, a series of numbers-printing mechanisms and a calculating mechanism, two sets of keys, arranged in successive rows on a common keyboard, one set operating the type-writing mechanism and the other set arranged in columns, one column for each arithmetical denomination, controlling the numbers-printing and the calculating mechanism, and for actuating the numbers-printing and the calculating mechanisms.

18. An arithmograph, comprising a type-writing mechanism and a series of mechanisms for setting, printing and adding of numbers, a keyboard, two sets of keys, arranged in successive rows on the keyboard, the keys of one set being operatively connected with the type-writing mechanism, and the keys of the other set being arranged in columns, one column for each arithmetical denomination, and each key being provided with means to engage, when depressed, with the mechanism for setting, printing and adding numbers, and thereby to control the movements of these mechanisms, and means for actuating the mechanisms for setting, printing and adding of figures.

19. An arithmograph, comprising a series of movable rack-bars, mechanism for moving the rack-bars; keys, bearing consecutive numbers, arranged in columns, one column for each rack-bar, and each column representing the digits of one denomination; means for limiting, by depressing one key in the column, the motion of the rack-bars proportionately to the number on the depressed key; a shaft gear-wheels, having teeth proportioned to mesh with those of the movable rack-bars; set to rotate on the shaft, one gear-wheel for each rack-bar; mechanism for moving the gear-wheel of the next adjoining column of higher denomination a distance of one tooth when the gear-wheel of the next adjoining column of lower denomination is rotated a distance of ten units or more; a locking device for this mechanism; a cam, one on each gear-wheel, in position to engage with the locking device of the next adjoining column of higher denomination, and thereby to release the mechanism for moving the gear-wheel of that column; and mechanism for moving the gear-wheels into and out of engagement with the movable rack-bars, and with the mechanism for rotating the gear-wheels of the columns of higher denominations a distance of one tooth, as herein specified.

20. An arithmograph, comprising a series of movable rack-bars, mechanism for moving the rack-bars, and a series of steps on each rack-bar; keys, bearing consecutive numbers, arranged in columns, one column for each rack-bar, and each column representing the digits of one denomination; stops on the stems of the keys, in position to engage the steps of the rack-bars; a shaft, gear-wheels, having teeth proportioned to mesh with those of the movable rack-bars, set to rotate on the shaft, one gear-wheel for each rack-bar; mechanism for moving the gear-wheel of the next adjoining column of higher denomination a distance of one tooth when the gear-wheel of the next adjoining column of lower denomination is rotated a distance of ten units or more; a locking device for this mechanism; a cam, one on each gear-wheel, in position to engage with the locking device of the next adjoining column of higher denomination, and thereby to release the mechanism for moving the gear-wheel of that column; and mechanism for moving the gear-wheels into and out of engagement with the movable rack-bars, and with the mechanism for rotating the gear-wheels of the columns of higher denominations a distance of one tooth, as herein specified.

21. An arithmograph, comprising a series of movable rack-bars, mechanism for moving the rack-bars; keys, bearing consecutive numbers, arranged in columns, one column for each rack-bar, and each column representing the digits of one denomination; means for limiting, by depressing one key in the column, the motion of the rack-bars proportionately to the number on the depressed key; a platen, oscillating arms, means for propelling them against the platen, mechanism for receding them and for holding them in this receded position while the rack-bars are moved, segmental type-sectors, one pivoted to each oscillating arm, and mechanism for transmitting the motion of the rack-bars to the type-sectors, to swing them on their pivots each a distance proportionate to the motion of its corresponding rack-bar; a shaft, gear-wheels, having teeth proportioned to mesh with those of the movable rack-bars, set to rotate on the shaft, one gear-wheel for each rack-bar; mechanisms for moving the gear-wheel of the next adjoining column of higher denomination a distance of one tooth when the gear-wheel of the next adjoining column of lower denomination is rotated a distance of ten units or more; a locking device for this mechanism; a cam, one on each gear-wheel, in position to engage with the locking device of the next adjoining column of higher denomination, and thereby to release the mechanism for moving the gear-wheel of that column; mechanism for moving the gear-wheels into and out of engagement with their corresponding movable rack-bars, and with the mechanism for rotating the gear-wheels of the columns of higher denominations a distance of one tooth as herein specified; and means for releasing the oscillating arms after the motion of the rack-bars is completed.

22. An arithmograph, comprising a series of movable rack-bars, mechanism for moving the rack-bars, and a series of steps on each rack-bar; keys, bearing consecutive numbers, arranged in columns, one column for each rack-bar, and each column representing the digits of one denomination; stops on the stems of the keys, in position to engage the steps of the rack-bars; a platen, oscillating arms, means for propelling them against the platen, mechanism for receding them and for holding them in this receded position while the rack-bars are moved, segmental type-sectors, one pivoted to each oscillating arm, and mechanism for transmitting the motion of the rack-bars to the type-sectors, to swing them on their pivots each a distance proportionate to the motion of its corresponding rack-bar; a shaft, gear-wheels, having teeth proportioned to mesh with those of the movable rack-bars, set to rotate on the shaft, one gear-wheel for each rack-bar; mechanisms for moving the gear-wheel of the next adjoining column of higher denomination a distance of one tooth when the gear-wheel of the next adjoining column of lower denomination is rotated a distance of ten units or more; a locking device for this mechanism; a cam, one on each gear-wheel, in position to engage with the locking device of the next adjoining column of higher denomination, and thereby to release the mechanism for moving the gear-wheel of that column; mechanism for moving the gear-wheels into and out of engagement with their corresponding movable rack-bars, and with the mechanisms for rotating the gear-wheels of the columns of higher denominations a distance of one tooth as herein specified; and means for releasing the oscillating arms after the motion of the rack-bars is completed.

23. An arithmograph, comprising a series of movable rack-bars, mechanism for moving the rack-bars; keys, bearing consecutive numbers, arranged in columns, one column for each rack-bar, and each column representing the digits of one denomination; means for limiting, by depressing one key in the column, the motion of the rack-bars proportionately to the number on the depressed key; type-sectors mounted on movable supports and mechanism, operatively connected with the rack-bars for moving the type-sectors each a distance proportionate to the motion of its corresponding rack-bars; a shaft; gear-wheels, having teeth proportioned to mesh with those of the movable rack-bars, set to rotate on the shaft, one gear-wheel for each rack-bar; mechanisms for moving the gear-wheel of the next adjoining column of higher denomination a distance of one tooth when the gear-wheel of the next adjoining column of lower denomination is rotated a distance of ten units or more; a locking device for this mechanism; a cam, one on each gear-wheel, in position to engage with the locking device of the next adjoining column of higher denomination, and to release the mechanism for moving the gear-wheel of that column; mechanism for moving the gear-wheels into and out of engagement with their corresponding movable rack-bars, and alternately into and out of engagement with their corresponding movable rack-bars, and alternately into and out of engagement with the mechanism for rotating the gear-wheels of the columns of higher denominations a distance of one tooth, as herein specified.

24. An arithmograph, comprising a series of movable rack-bars; mechanism for moving the rack-bars; a series of steps on each rack-bar; keys, bearing consecutive numbers, arranged in columns, one column for each rack-bar, and each column representing the digits of one denomination; stops on the stems of the keys, in position to engage the steps of the rack-bars, type-sectors mounted on movable supports and mechanism, operatively connected with the rack-bars for moving the type-sectors each a distance proportionate to the motion of its corresponding rack-bars; a shaft; gear-wheels, having teeth proportioned to mesh with those of the movable rack-bars, set to rotate on the shaft, one gear-wheel for each rack-bar; mechanisms for moving the gear-wheel of the next adjoining column of higher denomination a distance of one tooth when the gear-wheel of the next adjoining column of lower denomination is rotated a distance of ten units or more; a locking device for this mechanism; a cam, one on each gear-wheel, in position to engage with the locking device of the next adjoining column of higher denomination, and to release the mechanism for moving the gear-wheel of that column; mechanism for moving the gear-wheels into and out of engagement with their corresponding movable rack-bars, and alternately into and out of engagement with the mechanism for rotating the gear-wheels of the columns of higher denominations a distance of one tooth, as herein specified.

25. An arithmograph, comprising a series of movable rack-bars, mechanism for moving the rack-bars; keys, bearing consecutive numbers, arranged in columns, one column for each rack-bar, and each column representing the digits of one denomination; means for limiting, by depressing one key in the column, the motion of the rack-bars proportionately to the number on the depressed key; type-sectors mounted on movable supports and mechanism, operatively connected with the rack-bars for moving the type-sectors each a distance proportionate to the motion of its corresponding rack-bars; a shaft; gear-wheels, having teeth proportioned to mesh with those of the movable rack-bars, set to rotate on the shaft, one gear-wheel for each rack-bar; mechanisms for moving the gear-wheel of the next adjoining column of higher denomination a distance of one tooth when the gear-wheel of the next adjoining column of lower denomination is rotated a distance of ten units or more; a locking device for this mechanism; a cam, one on each gear-wheel, in position to engage with the locking device of the next adjoining column of higher denomination, and to release the mechanism for moving the gear-wheel of that column; mechanism for moving the gear-wheels into and out of engagement with their corresponding movable rack-bars, and alternately into and out of engagement with the mechanism for rotating the gear-wheels of the columns of higher denominations a distance of one tooth, as herein specified; a platen, mechanism for receding the supports of the type-sectors from the platen and for holding them in receded position while the rack-bars are being moved, mechanism for releasing the type-sector supports after the motions of the bars are completed, and means for propelling them forcibly, and each independently of all others, toward the platen.

26. The combination of a platen, type-bars movable to strike the front of the platen, type-carriers for arithmetical records, located out of the path of the movement of the type-bars so that the latter may have free movement, and devices for moving the type-carriers to print on the platen in alinement with any record which may have been produced by the type-bars, before rotation of the platen, substantially as specified.

27. In an adding and writing machine, comprising a type-writing mechanism and mechanism for setting and printing of numbers, two sets of keys arranged in successive rows on a common keyboard, the keys of one set being operatively connected with the type-writing mechanism and the keys of the other set provided with means to engage, when depressed, with the mechanism for setting and printing of numbers, and thereby to control the setting of the numbers, and mechanism for actuating the mechanism for setting and printing of numbers.

28. In an adding and writing machine, comprising a type-writing mechanism and mechanism for setting and printing of numbers; a keyboard, two sets of keys arranged in successive rows on the keyboard, the keys of one set being operatively connected with the type-writing mechanism, and the keys of the other set provided with means to engage, when depressed, with the mechanism for setting and printing of numbers, and thereby to control the setting of the numbers to be printed, and means for actuating the mechanism for setting and printing of numbers.

HALCOLM ELLIS.

Witnesses:

WILLIAM H. REID,
JOHN A. PAULSON.

It is hereby certified that in reissue Letters Patent No. 12,528, granted August 28, 1906, upon the application of Halcolm Ellis, of New York, N. Y., for an improvement in "Type-Writing, Calculating, and Calculator-Recording Machines," an error appears in the printed specification requiring correction, as follows: In line 64, page 2, the compound word "type-bar" should read *type-bars;* and that the said Letters Patent should be read with this correction therein that the same may conform to the record of the case in the Patent Office.

Signed and sealed this 16th day of October, A. D., 1906.

[SEAL.]

F. I. ALLEN,

*Commissioner of Patents.*